(12) United States Patent
Okada et al.

(10) Patent No.: US 10,514,085 B2
(45) Date of Patent: Dec. 24, 2019

(54) INTERNAL COMBUSTION ENGINE OF SADDLE RIDING VEHICLE

(71) Applicant: HONDA MOTOR CO., LTD., Tokyo (JP)

(72) Inventors: Nozomi Okada, Wako (JP); Yosuke Hoi, Wako (JP); Isao Azumagakito, Wako (JP); Shigeru Awazu, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 8 days.

(21) Appl. No.: 15/914,270

(22) Filed: Mar. 7, 2018

(65) Prior Publication Data
US 2018/0283506 A1 Oct. 4, 2018

(30) Foreign Application Priority Data
Mar. 30, 2017 (JP) .................. 2017-069141

(51) Int. Cl.
F01L 1/02 (2006.01)
F16H 7/08 (2006.01)
(Continued)

(52) U.S. Cl.
CPC ................. F16H 7/08 (2013.01); F01B 1/01 (2013.01); F01L 1/022 (2013.01); F01L 1/053 (2013.01); F01L 13/085 (2013.01); F01M 1/02 (2013.01); F01M 1/06 (2013.01); F02B 61/02 (2013.01); F01L 1/185 (2013.01); F01L 2001/0475 (2013.01); F01L 2001/0476 (2013.01); F01L 2001/0537 (2013.01); F01L 2810/02 (2013.01); F01M 11/03 (2013.01);
(Continued)

(58) Field of Classification Search
CPC ............... F16H 7/08; F16H 2007/0812; F16H 2007/0842; F01L 2810/02; F01M 1/02; F01M 2001/064
USPC ..................... 123/90.27, 90.33, 90.38, 90.31
See application file for complete search history.

(56) References Cited

U.S. PATENT DOCUMENTS 7,156,060 B2 * 1/2007 Oshita .................. F01L 1/02
123/90.17
2006/0260873 A1 11/2006 Suzuki et al.

FOREIGN PATENT DOCUMENTS

JP 61-234214 A 10/1986
JP 4-119311 U 10/1992
(Continued)

Primary Examiner — Ching Chang
(74) Attorney, Agent, or Firm — Birch, Stewart, Kolasch & Birch, LLP

(57) ABSTRACT

A cam chain tensioner device of an internal combustion engine includes a cam chain tensioner, and a tensioner lifter pressing the cam chain tensioner to a cam chain. The tensioner lifter is mounted on an inclined upper surface of the cylinder head. The cylinder head has therein a valve train oil supply passage supplying oil from an oil pump to the valve train camshafts, and a tensioner lifter oil supply passage supplying oil to the tensioner lifter. The valve gear oil supply passage has a branching portion where the tensioner lifter oil supply passage branches. The branching portion is at a position higher than the tensioner lifter, and communicates with the tensioner lifter disposed at a position lower than the branching portion. It is thus possible to prevent fluttering of the cam chain and to reduce noise generated by the cam chain at the time of restart of the engine after it is stopped.

7 Claims, 16 Drawing Sheets

(51) Int. Cl.
*F01L 1/053* (2006.01)
*F01M 1/02* (2006.01)
*F02B 61/02* (2006.01)
*F01B 1/01* (2006.01)
*F01L 13/08* (2006.01)
*F01M 1/06* (2006.01)
*F01M 11/03* (2006.01)
*F01L 1/18* (2006.01)
*F01L 1/047* (2006.01)

(52) U.S. Cl.
CPC .................. *F01M 2001/064* (2013.01); *F16H 2007/0812* (2013.01); *F16H 2007/0842* (2013.01); *F16H 2007/0872* (2013.01); *F16H 2007/0893* (2013.01); *F16H 2007/0897* (2013.01)

(56) References Cited

FOREIGN PATENT DOCUMENTS

| | | |
|---|---|---|
| JP | 2006-291924 A | 10/2006 |
| JP | 4245237 B2 | 3/2009 |

* cited by examiner

INTERNAL COMBUSTION ENGINE OF SADDLE RIDING VEHICLE

TECHNICAL FIELD

The present invention relates to an internal combustion engine of a saddle riding vehicle, which can reduce noise from a cam chain generated at the time of restarting the internal combustion engine after the engine is stopped.

BACKGROUND ART

An example of a conventional internal combustion engine of a saddle riding vehicle is known, which is provided with a cam chain tensioner device and a cylinder with its axis inclined with respect to a vertical direction, as disclosed in Patent Document 1 below. In the internal combustion engine, a lubricant supply passage to a tensioner lifter of the cam chain tensioner device has an ascending slope. Accordingly, when operation of the internal combustion engine is stopped, lubricant oil returns from the tensioner lifter to a supply source through the lubricant supply passage. For this reason, when the engine is restarted after it is stopped, operability of the tensioner lifter cannot be sufficiently increased until oil is sufficiently supplied to the tensioner lifter. This situation brings about a drawback that noise from the cam chain cannot be reduced mainly because of fluttering of the cam chain that occurs due to the reduced operability of the tensioner lifter.

PRIOR ART

Patent Document

[Patent Document] JP 4 245 237 B

SUMMARY OF INVENTION

Technical Problem

The present invention has been made to overcome the above-mentioned drawback, and it is an object of the present invention to provide an internal combustion engine of a saddle riding vehicle where noise generated by a cam chain at the time of restarting the engine can be reduced by reducing backflow of lubricant oil from the tensioner lifter after the internal combustion engine is stopped.

Solution to Problem

To attain the above object, according to the present invention, there is provided an internal combustion engine of a saddle riding vehicle, including a crankcase rotatably supporting a crankshaft therein, a cylinder portion fixedly mounted on the crankcase with a cylinder axis inclined relative to a vertical direction, cam shafts of a valve train, a cam chain for transmitting power from the crankshaft to the camshafts, and a cam chain tensioner device for pressing and tensioning the cam chain, wherein:

the cam chain tensioner device includes a cam chain tensioner swingably supported by the crankcase to contact the cam chain, and a tensioner lifter pressing the cam chain tensioner to cause the same to press and tension the cam chain; the tensioner lifter is disposed on an inclined upper surface of the cylinder portion and directed toward the cam chain; the engine includes an oil pump, a valve gear oil supply passage for supplying oil from the oil pump to the camshafts, and a tensioner lifter oil supply passage for supplying oil to the tensioner lifter; the valve gear oil supply passage has a branching portion where the tensioner lifter oil supply passage branches; and the branching portion branches at a position higher than the tensioner lifter and communicates with the tensioner lifter disposed at a position lower than the branching portion to send oil into the tensioner lifter.

With such a configuration, at the time of stopping the internal combustion engine, outflow of oil from inside the tensioner lifter is reduced so that oil is retained in the tensioner lifter, so that the tensioner lifter can sufficiently press the cam chain tensioner on the cam chain at the time of restarting the engine. Accordingly, noise of the cam chain can be reduced by preventing fluttering of the cam chain.

In a preferred embodiment of the invention, the valve gear oil supply passage is led into the camshafts disposed above the valve gear oil supply passage through bolt insertion holes used to pass stud bolts for fixing the cylinder portion to the crankcase; and the branching portion is formed in an intersecting manner with the bolt insertion holes.

With such a configuration, by using the bolt insertion holes as the valve gear oil supply passages and by making the bolt insertion holes forming the valve gear oil supply passage and the tensioner lifter oil supply passage intersect with each other, to thus form the branching portion, it is possible to enhance machinability and productivity.

In a preferred embodiment of the invention, the cylinder portion has a tensioner lifter mounting surface for mounting the tensioner lifter thereon, the tensioner lifter mounting surface being inclined in a direction opposite to inclination of the cylinder axis of the cylinder portion; the tensioner lifter is fixedly mounted on the cylinder portion by fastening members extending in a direction perpendicular to the tensioner lifter mounting surface; and the tensioner lifter oil supply passage is arranged parallel to the fastening members.

With such a configuration, by arranging the tensioner lifter oil supply passage and the fastening members parallel to each other, both the tensioner lifter oil supply passage and threaded holes with which fastening members threadedly engage are oriented in the same direction so that machinability is improved.

In a further preferred embodiment of the invention, the bolt insertion holes as part of the valve gear oil supply passage are formed along a side surface of the cylinder portion; the valve gear oil supply passage includes a center oil passage forming a portion of the valve gear oil supply passage and extending in the cylinder portion adjacent to the cylinder axis; and the valve gear oil supply passage includes a valve-gear-side oil passage forming a portion of the valve gear oil supply passage and extending from the tensioner lifter oil supply passage to a central portion of the cylinder portion through the branching portion, to communicate with the center oil passage.

With such a configuration, return oil from the side of the valve gear can be used as oil for maintaining lubrication property of the tensioner lifter. Accordingly, even when a long period of time elapses from stopping of the engine to restart of the operation of the engine, a good lubrication ability of the tensioner lifter can be maintained.

In a still further preferred embodiment of the invention, the camshafts include an intake camshaft having an intake cam and an exhaust camshaft having an exhaust intake cam, the intake camshaft and the exhaust camshaft being arranged parallel to each other with a center of the cylinder portion located therebetween, as viewed in the direction of the cylinder axis; and the center oil passage branches into oil passages toward the intake camshaft and the exhaust cam shaft to supply oil thereto.

With such a configuration, oil can be readily supplied to both the intake camshaft and the exhaust camshaft.

In a preferred embodiment of the invention, an oil filter is provided in the crankcase to filter oil to be supplied from the oil pump to the intake camshaft, the exhaust camshaft and the tensioner lifter.

With such a configuration, oil to be supplied to the tensioner lifter can be cleaned and hence operability of the tensioner lifter can be maintained enhanced for a long period of time.

Further, in a preferred embodiment of the invention, the cam chain tensioner is pivotally supported at a lower end thereof to have an upper portion thereof to swing; and the tensioner lifter is mounted in an inclined attitude on the cylinder portion in a state where the tensioner lifter presses the cam chain in a direction including an upward directional component.

With such a configuration, oil lubrication property of the tensioner lifter can be enhanced while optimizing the direction in which the tensioner lifter presses the cam chain tensioner.

Advantageous Effects of Invention

According to the present invention, at the time of stopping the internal combustion engine, outflow of oil from inside the tensioner lifter is reduced so that oil is retained in the tensioner lifter, whereby the tensioner lifter can sufficiently press the cam chain tensioner at the time of restarting the internal combustion engine. Accordingly, noise of the cam chain can be reduced by preventing fluttering of the cam chain.

DETAILED DESCRIPTION

Figure 1:
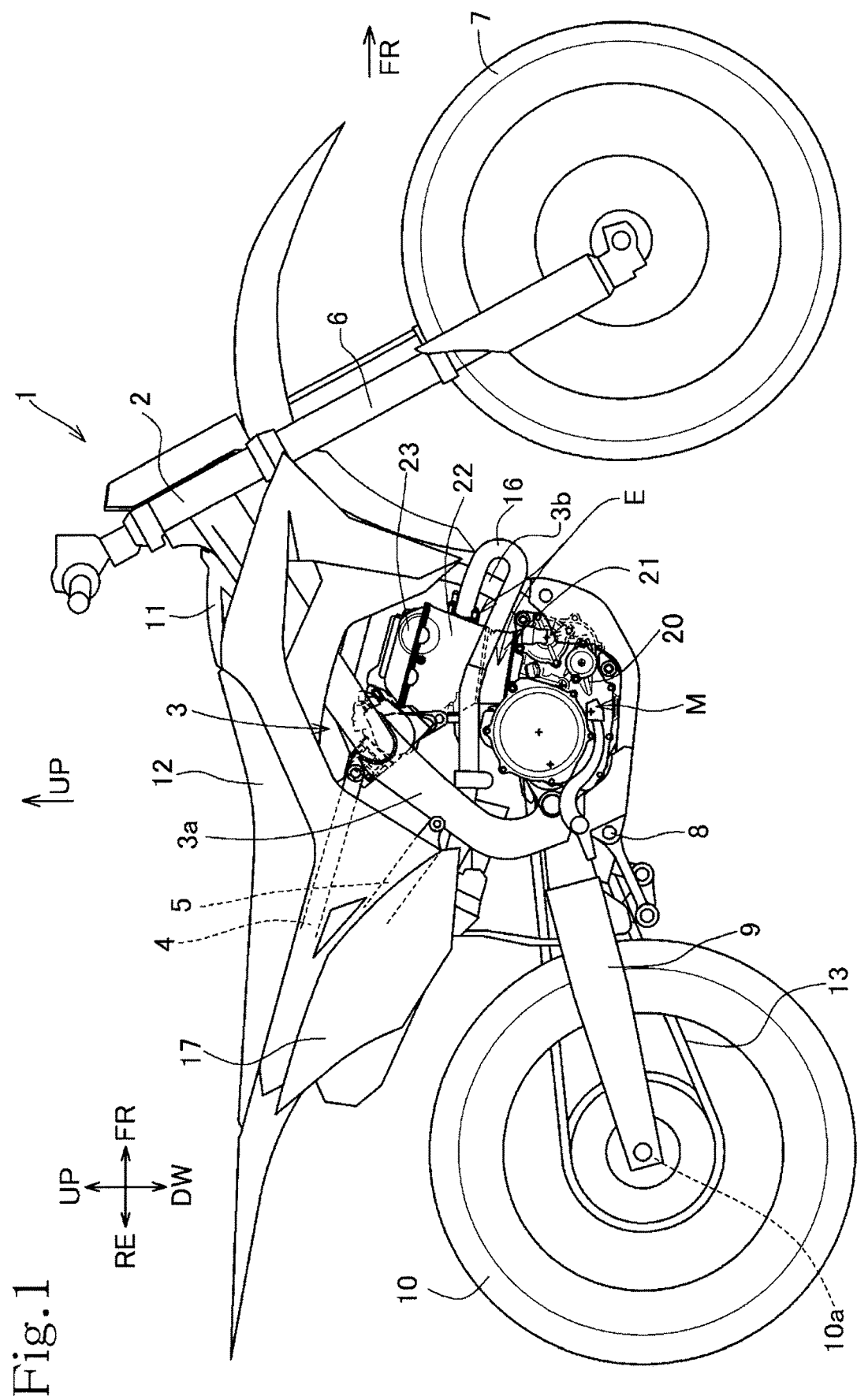
FIG. 1 is a right side view of a motorcycle on which an internal combustion engine of a saddle riding vehicle according to one embodiment of the present invention is mounted.

Hereinafter, an oil supply structure of a decompression device of an internal combustion engine of a saddle riding vehicle, according to an embodiment of the present invention, will be described with reference to the drawings.

In the description of this specification and claims, directions of frontward, rearward, leftward, rightward, upward, downward and so on are directions with respect to a vehicle on which is mounted an internal combustion engine provided with an oil filter mounting structure of an internal combustion engine according to this embodiment. In this embodiment, the vehicle is a saddle riding vehicle and, to be more specific, a two-wheeled motorcycle 1. Further, in the drawings, an arrow FR indicates a frontward direction of the vehicle, an arrow LH indicates a leftward direction of the vehicle, an arrow RH indicates a rightward direction of the vehicle, and an arrow UP indicates an upward direction of the vehicle, respectively. Further, small arrows in the drawings schematically show flow of oil in the embodiment of the invention.

An oil supply structure of a decompression device of the engine according to the embodiment of the present invention will be described with reference to the drawings including FIGS. 1 to 21. FIG. 1 is a right side view showing the motorcycle 1 on which is mounted an internal combustion engine E to which an oil supply structure of a decompression device according to the embodiment is applied.

The internal combustion engine E is a water-cooled, single cylinder, 4-valve, WOHC-type, 4-stroke cycle internal combustion engine mounted on the motorcycle 1. The internal combustion engine E includes a transmission M as an integral part thereof on a rear portion in a crankcase 20, whereby a so-called power unit is formed. The engine E is mounted on the motorcycle 1 in a state where a crankshaft 30 of the engine is directed in a vehicle width direction of the motorcycle 1, that is, in a lateral direction.

The motorcycle 1 includes a frame 3 directed in the longitudinal direction of the vehicle, and the frame 3 is fixed to a head pipe 2 mounted on a front end of the frame 3. A pair of left and right main frame members 3a extends rearward from the head pipe 2 in a slightly downward direction and, thereafter, the pair of left and right main frame members 3a is bent gradually downward and reaches a lower end of the frame 3. A down frame member 3b extends obliquely downward from the head pipe 2 at a steep angle, and the down frame member 3b is connected to lower ends of the main frame members 3a. A pair of left and right seat rails 4 extends rearward from intermediate portions of the main frame members 3a. A pair of left and right back stays 5 connects the center portions of the seat rails 4 and lower portions of the main frame members 3a to each other, respectively, whereby the left and right back stays 5 support the left and right seat rails 4. The head pipe 2 supports a front fork 6 which supports a front wheel 7 in a rotatable manner.

A pivot shaft 8 is mounted on a lower end portion of the main frame members 3a, and a rear fork 9, having a front end thereof swingably supported by the pivot shaft 8, extends rearward. A rear wheel 10 is rotatably supported on a rear end of the rear fork 9. A rear cushion not shown in the figure is interposed between the rear fork 9 and the main frame members 3a. A fuel tank 11 is disposed in a manner extending between front portions of the main frame members 3a, and a rider's seat 12 is disposed behind the fuel tank 11 and supported by the seat rails 4.

Figure 2:
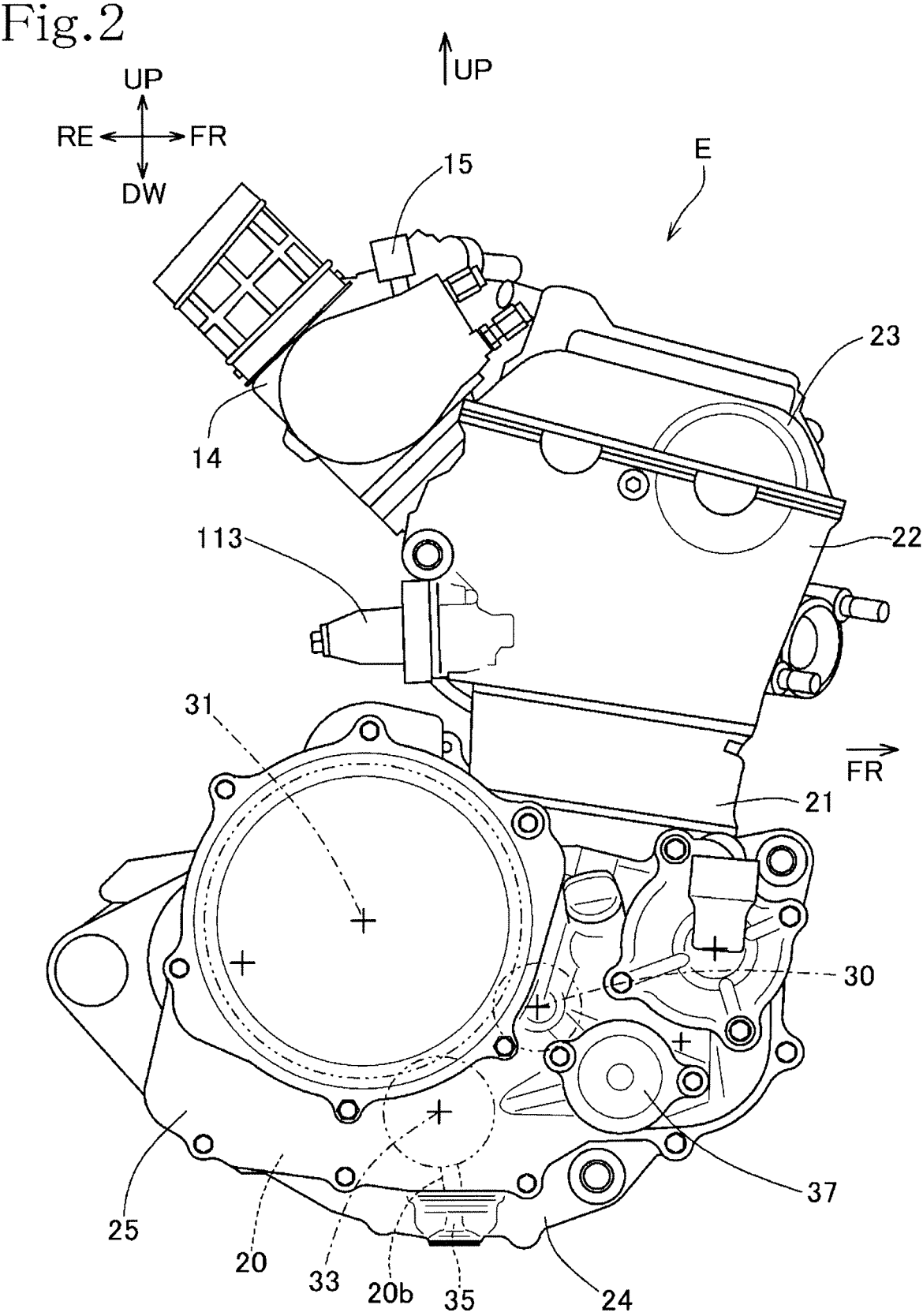
FIG. 2 is an enlarged right side view of the internal combustion engine shown in FIG. 1.

As shown in FIGS. 1 and 2, the internal combustion engine E is suspended from the main frame members 3a and the down frame member 3b in a standing attitude in which a cylinder axis is inclined slightly frontward in a position above the crankcase 20.

Figure 7:
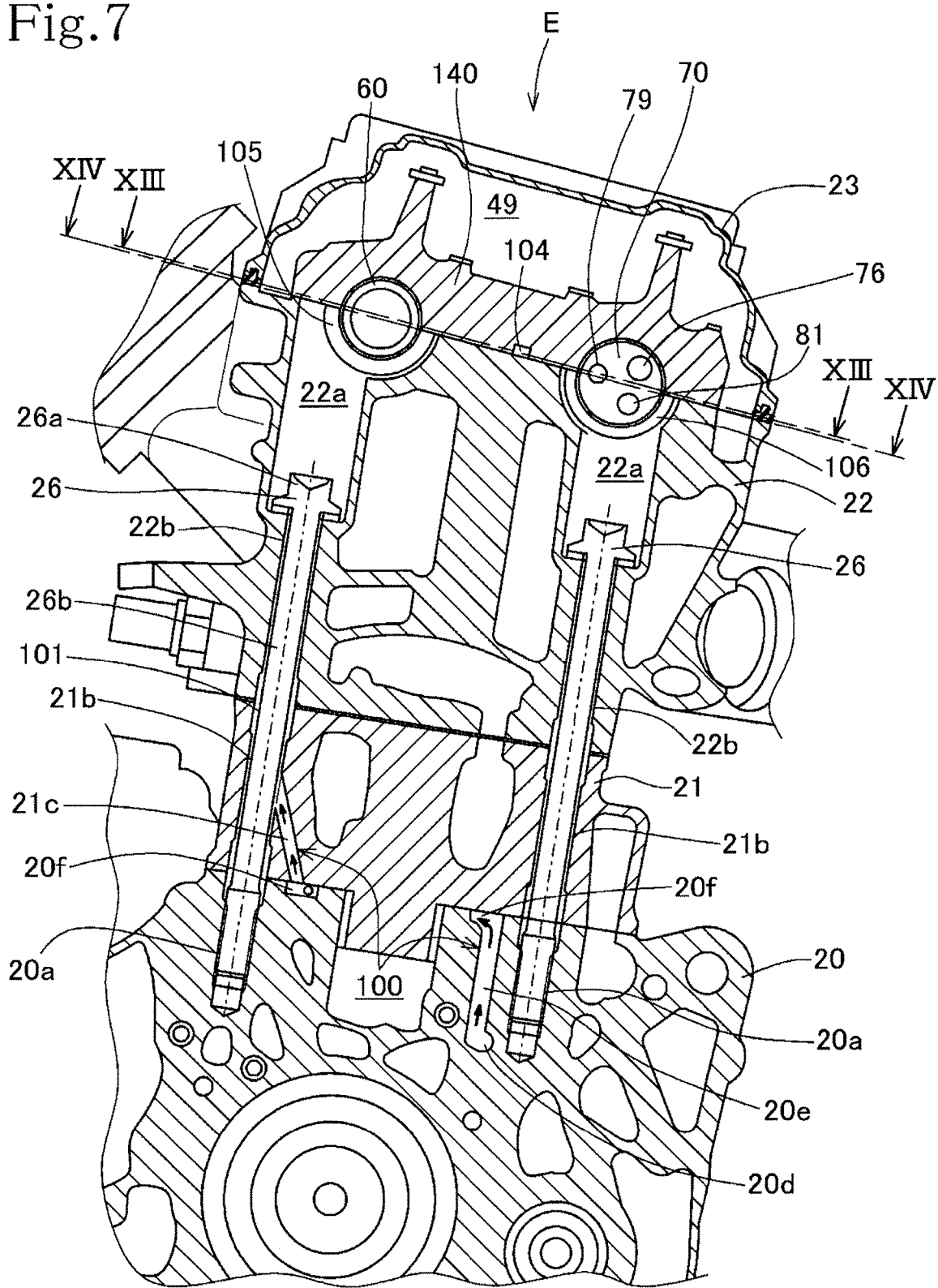
FIG. 7 is a longitudinal sectional view of the internal combustion engine taken along a line VII-VII in FIG. 13.

As shown in FIGS. 2 and 7, the internal combustion engine E has an integral body formed of a crankcase 20, a cylinder body 21, and a cylinder head 22. That is, the crankcase 20, the cylinder body 21, and the cylinder head 22 are sequentially stacked on each other. Stud bolts 26 are inserted first into bolt accommodating holes 22a formed in an upper surface of the cylinder head 22, respectively. The stud bolts 26 are then made to pass through bolt insertion holes 22b formed in the cylinder head 22 and through bolt insertion holes 21b formed in the cylinder body 21. The stud bolts 26 are finally screwed into bolt holes 20a formed in the crankcase 20. A cylinder head cover 23 is mounted on an upper portion of the cylinder head 22. Left and right sides of the crankcase 20 are covered by case covers 25 (FIG. 2). An oil pan 24 (FIG. 2) is mounted on a lower portion of the crankcase 20. A cylinder bore 21a (cylinder) is formed in the cylinder body 21 in a vertically penetrating manner, and the cylinder body 21 and the cylinder head 22 form a cylinder part of the engine.

Figure 3:
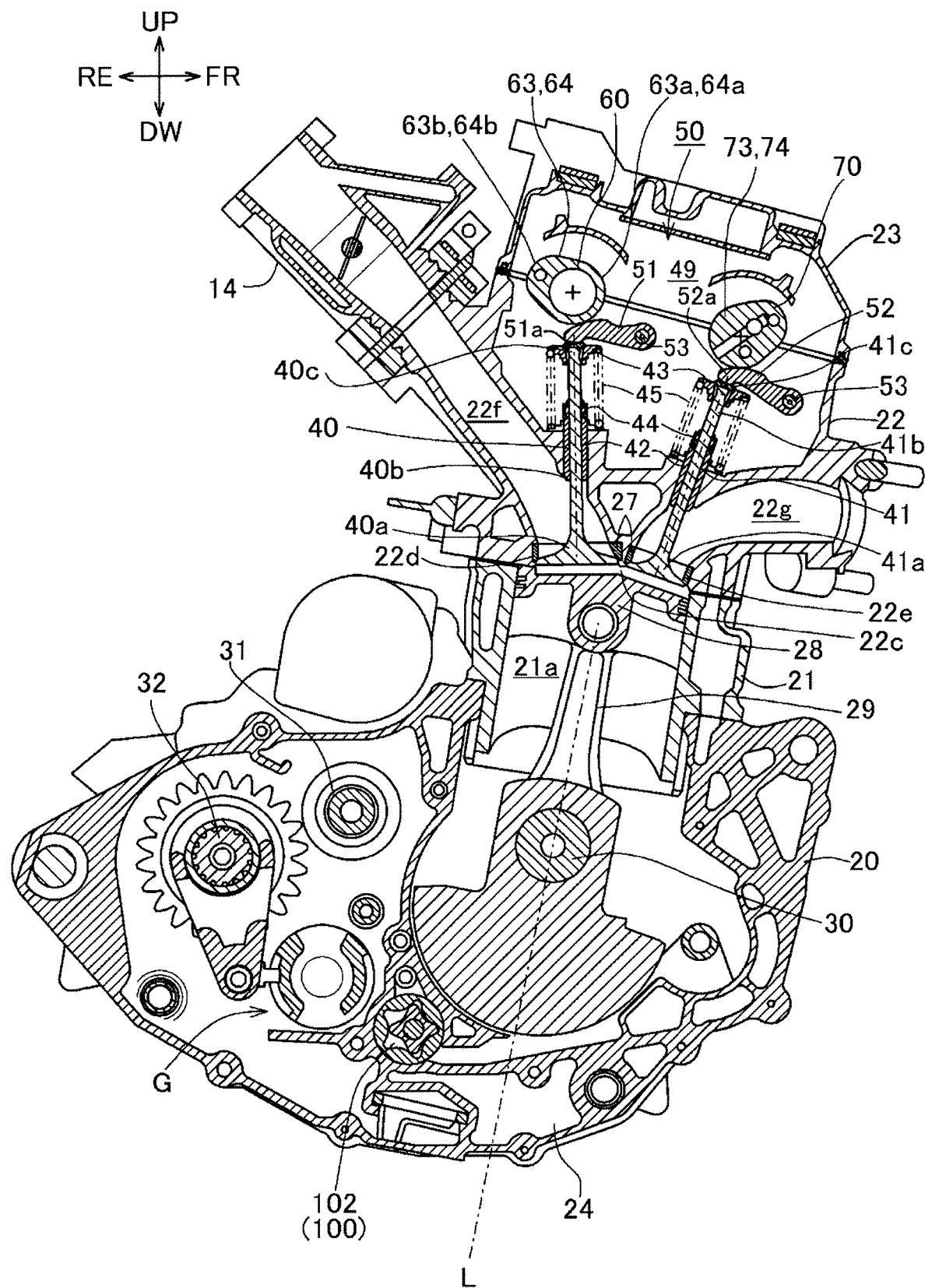
FIG. 3 is a longitudinal sectional view of the internal combustion engine taken along a line in FIG. 13.

As shown in FIG. 3, the cylinder body 21 is disposed with a cylinder axis L inclined with respect to a vertical direction. A piston 28 is slidably fitted in the cylinder bore 21a in a vertical direction, and a crank pin of the crankshaft 30 is connected to the piston 28 by way of a connecting rod 29. A combustion chamber 22c is formed in the cylinder head 22. A combustion energy in the combustion chamber 22c of the engine E is converted into kinetic energy of the piston 28. Due to such a conversion, the piston 28 is moved up and down so that the crankshaft 30 is driven in rotation by way of the connecting rod 29.

As illustrated in FIG. 3, the crankshaft 30 of the internal combustion engine E is rotatably supported on the crankcase 20. A shift gear device G is assembled between the main shaft 31 disposed behind the crankshaft 30 and a counter shaft 32 forming an output shaft. A chain 13 (FIG. 1) is extended between and wound around the counter shaft 32 and an axle 10a (FIG. 1) of the rear wheel 10 so that power of the crankshaft 30 is transmitted to the rear wheel 10.

As FIG. 3 shows, a pair of intake valve openings 22d and a pair of exhaust valve openings 22e, which open in an upper wall surface of the combustion chamber 22c, are formed in the cylinder head 22. An ignition plug hole (not shown in the figure) into which an ignition plug (not shown in the figure) is inserted opens such that the ignition plug hole is positioned at an approximately center between the intake valve openings 22d and the exhaust valve openings 22e. The intake valve openings 22d and the exhaust valve openings 22e are respectively communicated with an intake port 22f and an exhaust port 22g formed in the cylinder head 22.

As shown in FIG. 3, a throttle body 14 including a fuel injection valve 15 (FIG. 2), a connecting tube (not shown), and an air cleaner (not shown) are sequentially connected to the intake port 22f. Outside air sucked through the air cleaner is mixed with fuel injected from the fuel injection valve to form a fuel-air mixture. The fuel-air mixture is transferred to the combustion chamber 22c of the internal combustion engine E and is combusted. An exhaust gas from the engine is sent to a muffler 17 (FIG. 1) through an exhaust pipe 16 connected to the exhaust port 22g and is discharged to outside.

The internal combustion engine E includes: a pair of intake valves 40 which open and close to cause intake air from the intake ports 22f into the combustion chamber 22c, and a pair of exhaust valves 41 which open and close to cause exhaust gas from within the combustion chamber 22c to the exhaust ports 22g. The intake valves 40 open and close the intake valve openings 22d, and the exhaust valve 41 open and close the exhaust valve openings, respectively. Each of the intake valves 40 is formed of an umbrella portion 40a and a shaft portion 40b, and each of the exhaust valves 41 is formed of an umbrella portion 41a and a shaft portion 41b. The umbrella portions 40a and 41a are respectively valve elements which open and close the intake valve openings 22d and the exhaust valve openings 22e in each of which a valve seat 27 is press-fitted. The shaft portions 40b and 41b extend from the umbrella portions 40a and 41a to the outside of the combustion chamber 22c, respectively, and the shaft portions 40b and 41b are slidably fitted in valve guides 42 fitted in the cylinder head 22.

Shaft end portions 40c of the intake valves 40 and shaft end portions 41c of the exhaust valves 41 protrude upward from the valve guides 42 respectively, and the shaft end portions 40c and 41c are held by spring retainers 43 respectively. Coil-shaped valve springs 45 are mounted in a compressed state between the spring retainers 43 and spring receiving members 44 which are supported by the cylinder head 22 so as to face the corresponding spring retainer 43. The coil-shaped valve springs 45 surround peripheries of the shaft portions 40b of the intake valves 40 and the shaft portions 41b of the exhaust valves 41 respectively. The intake valves 40 and the exhaust valves 41 are constantly biased in valve closing directions by the valve springs 45.

A valve train 50 for opening and closing the intake valves 40 and the exhaust valves 41 is accommodated in a valve chamber 49 formed in an upper portion of the cylinder head 22 and defined by the cylinder head 22 and the cylinder head cover 23. In the valve train 50, an intake cam shaft 60, on which intake cams 63 and 64 are formed, and an exhaust cam shaft 70, on which exhaust cams 73 and 74 are formed, are rotatably supported by the cylinder head 22. Cam shaft holders 140 (see FIG. 5) are mounted on an upper surface of the cylinder head 22 using bolts 145. Along with the rotation of the intake cam shaft 60 and the exhaust cam shaft 70, the intake cams 63 and 64 and the exhaust cams 73 and 74 are rotated so that the intake valves 40 and the exhaust valves 41 are caused to be opened and closed.

Figure 4:
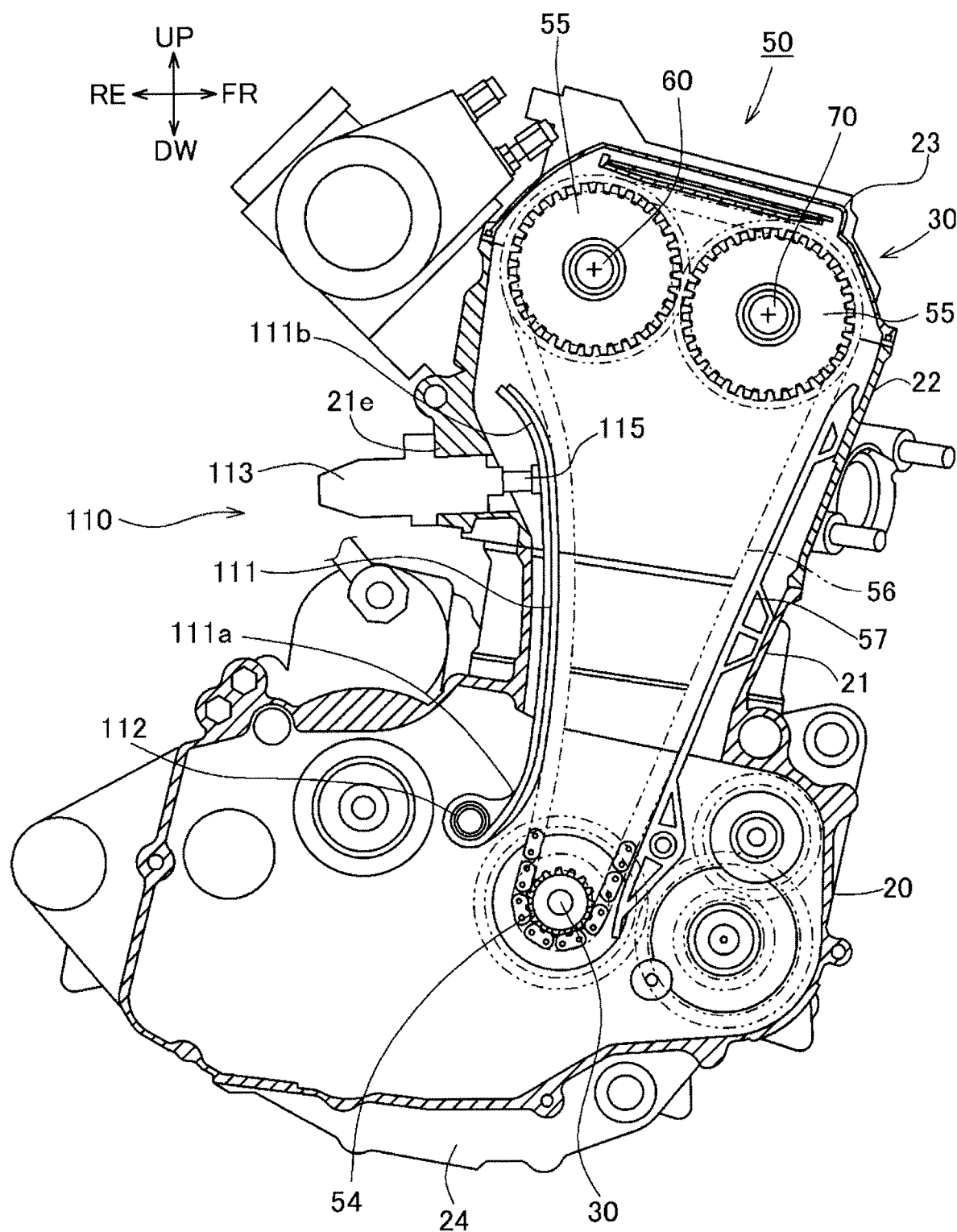
FIG. 4 is a longitudinal sectional view of the internal combustion engine taken along a line IV-IV in FIG. 13.
Figure 13:
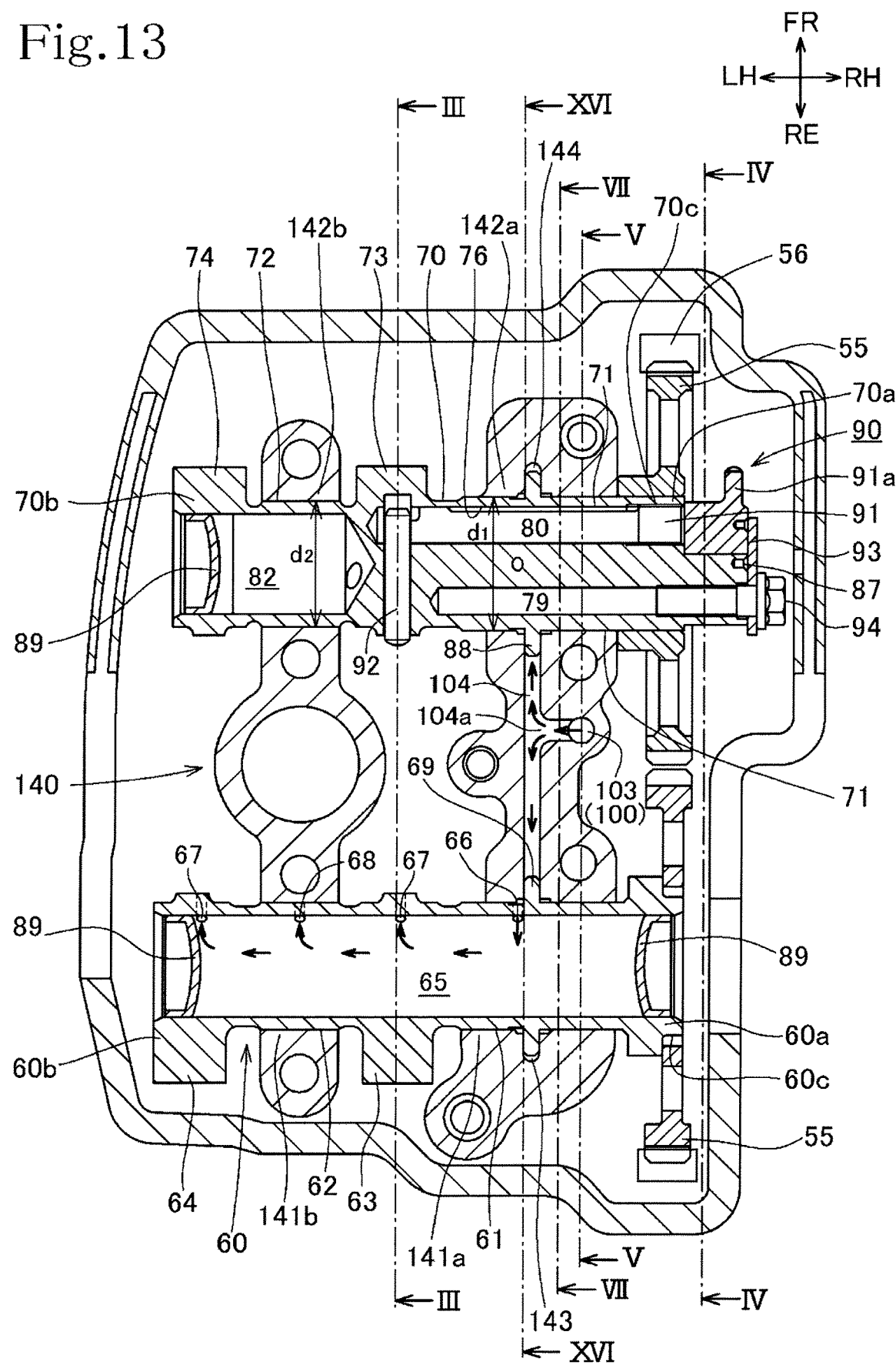
FIG. 13 is a sectional view of the internal combustion engine as viewed in a direction indicated by an arrow XIII-XIII in FIG. 7.

As shown in FIG. 13, input sprockets 55 are mounted on a right end of the intake cam shaft 60 and on a right end of the exhaust cam shaft 70, respectively, in an integrally rotatable manner. The pair of the input sprockets 55 are meshed with each other. As FIG. 4 shows, a cam chain 56 is extended between and wound around these input sprockets 55 and an output sprocket 54 on a right shaft portion of the crankshaft 30, so that the input sprockets 55 are rotatable with the crankshaft 30. Therefore, rotation of the crankshaft 30 causes rotation of both the intake cam shaft 60 and the exhaust cam shaft 70. Due to the rotation of the intake cam shaft 60, an intake rocker arm 51 (FIG. 3) is swung at a predetermined timing, and due to the rotation of the exhaust cam shaft 70, an exhaust rocker arm 52 (FIG. 3) is swung at a predetermined timing. Consequently, a pressing portion 51a of the intake rocker arm 51 presses a shaft end portion 40c of each of the intake valves 40, and an end portion 52a of the exhaust rocker arms 52 presses a shaft end portion 41c of each of the exhaust valves 41. Accordingly, the intake valve openings 22d and the exhaust valve openings 22e are opened and closed at predetermined timings, respectively.

As described above, for opening and closing the intake valves 40 and the exhaust valves 41 at predetermined timings, it is necessary to constantly maintain a tension of the cam chain 56 at a proper level. In the internal combustion engine E, to apply a fixed tension to the cam chain 56 for preventing free vibration of the cam chain 56, a cam chain guide 57 for guiding the cam chain 56 is provided as shown in FIG. 4, on a tension side of the cam chain 56 between the output sprocket 54 and one of the input sprockets 55, and a cam chain tensioner device 110 for pressing the cam chain 56 at a predetermined pressure is disposed on a slackening side of the cam chain 56 between the output sprocket 54 and the other of the input sprockets 55.

The cam chain tensioner device 110 includes: a cam chain tensioner 111 which presses the traveling cam chain 56 and slidably guides the cam chain 56; and a tensioner lifter 113 which presses the cam chain tensioner 111 at a predetermined pressure. The cam chain tensioner 111 is a low-pivot-type tensioner where a lower end portion 111a of the cam chain tensioner 111 on the side of the crankshaft 30 is swingably supported by the crankcase 20 by way of a collar 112, so that an upper end portion 111b of the cam chain tensioner 111 is swingable. A plunger 115 of the tensioner lifter 113 is in contact from outside with an upper end portion 111b of the tensioner lifter 113. The tensioner lifter 113 is disposed on a rear surface of the cylinder head 22, which forms an inclined upper surface of the cylinder head 22, in a state where the tensioner lifter 113 is directed toward the cam chain 56. The tensioner lifter 113 is mounted on the cylinder head 22 in such an inclined manner that the tensioner lifter 113 presses the cam chain 56 upward.

In the above-mentioned valve train 50, it is necessary to supply lubricant oil for lubricating sliding surfaces and the like of the rotating intake cam shaft 60 and the exhaust cam shaft 70. Accordingly, as shown in FIG. 5, the internal combustion engine E includes a valve train oil supply passage 100 for supplying oil from an oil pump 36 to the valve train 50 including the intake cam shaft 60 and the exhaust cam shaft 70 of the valve train 50.

Further, the plunger 115 of the tensioner lifter 113 of the cam chain tensioner device 110 is moved in sliding movement, and hence it is necessary to impart lubrication property to the inside of the tensioner lifter 113 by using oil. Accordingly, a tensioner lifter oil supply passage 102c is branched from the valve train oil supply passage 100 at a branching portion 102b of the valve train oil supply passage 100 thus supplying oil also to the tensioner lifter 113. As shown in FIG. 5, the branching portion 102b is positioned at a position higher than the tensioner lifter 113, and is communicated with the tensioner lifter 113 disposed at a position lower than the branching portion 102b through a tensioner lifter oil supply passage 102c.

The valve train oil supply passage 100 is formed as follows.

Figure 5:
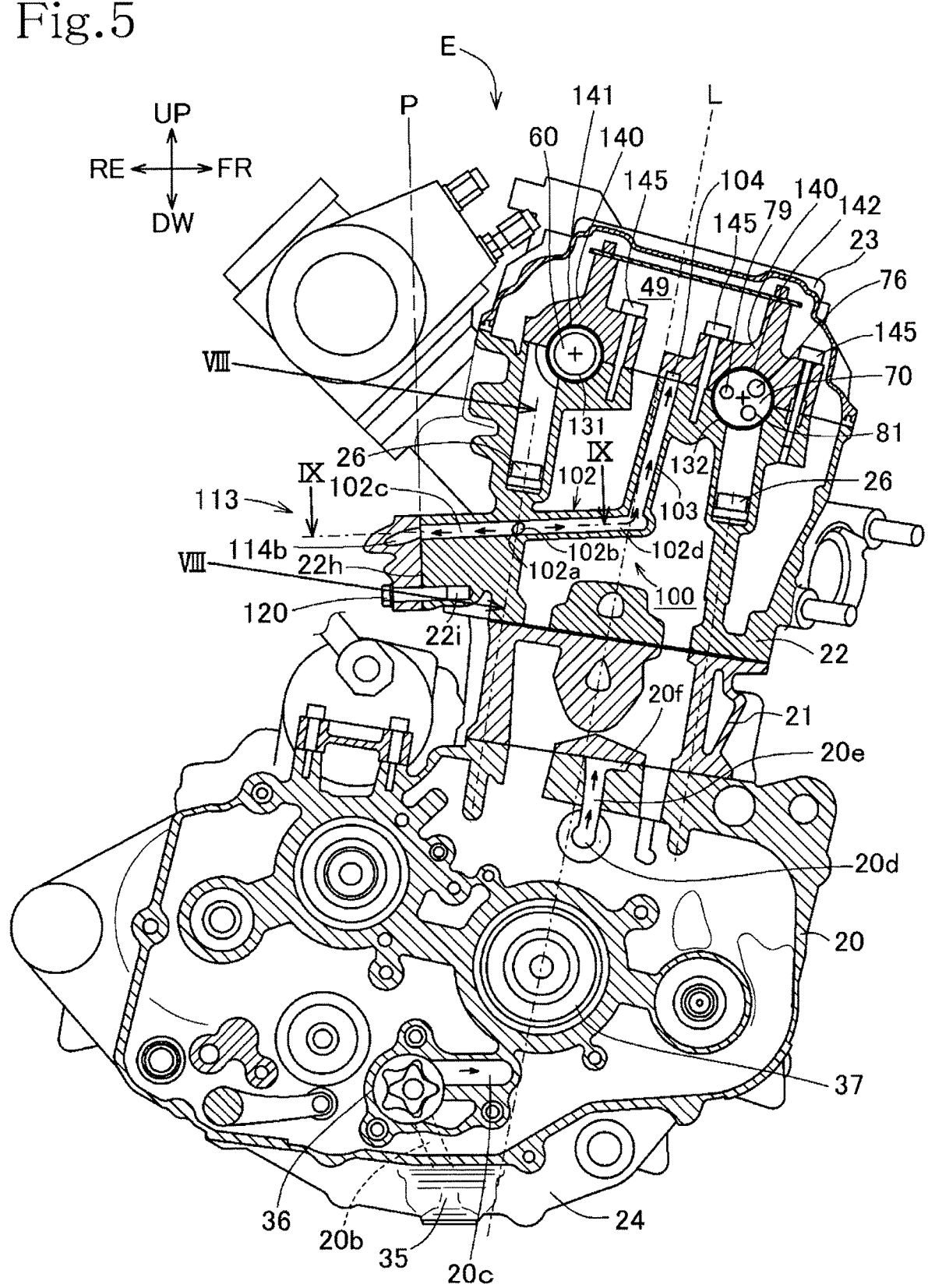
FIG. 5 is a longitudinal sectional view of the internal combustion engine taken along a line V-V in FIG. 13.

As shown in FIG. 5, the internal combustion engine E includes: the oil pump 36 which is driven in rotation when power of the crankshaft 30 is transmitted to the oil pump 36; and an oil filter 37 by which impurities are removed from oil before the oil from the oil pump 36 is fed to respective portions of the engine E. Oil delivered from the oil pump 36 through the oil filter 37 by which impurities are removed, is fed to the intake cam shaft 60, the exhaust cam shaft 70, and the tensioner lifter 113. The oil pump 36 has a shaft axis 33 as shown in FIGS. 2 and 6.

As depicted in FIG. 5, a strainer 35 is disposed in the oil pan 24, and the oil pump 36 for feeding lubricant oil to the respective portions of the internal combustion engine E is disposed on a lower portion of the crankcase 20. An oil passage 20b which connects the strainer 35 and a suction port of the oil pump 36 to each other is formed in the oil pan 24 and the crankcase 20.

Figure 6:
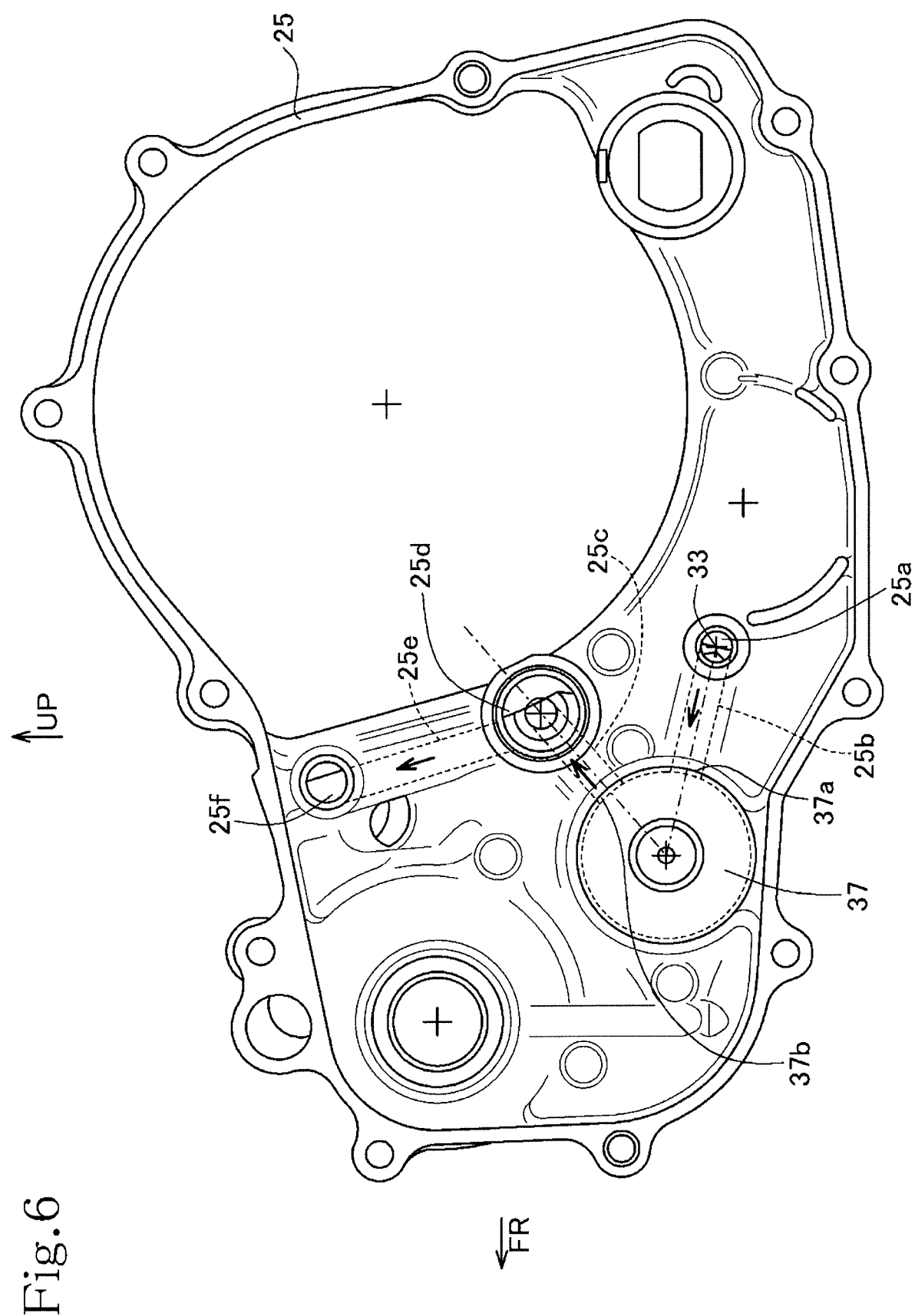
FIG. 6 is a view of a right case cover as viewed from inner side of the right case cover.

As shown in FIGS. 5 and 6, the oil filter 37, which is positioned at an approximately central portion of the crankcase 20 and removes impurities of lubricant, is held by being sandwiched between the crankcase 20 and the right case cover 25. An oil passage 20c is formed in the crankcase 20 to extend in a direction from a discharge port of the oil pump 36 to the oil filter 37.

An end portion of the oil passage 20c of the crankcase 20 is communicated with a communication port 25a which is formed in the wall of the right case cover 25 which is in contact with the crankcase 20 as shown in FIG. 6. In the right case cover 25 is formed an oil passage 25b which has one end thereof formed in the communication port 25a. The other end of the oil passage 25b is connected to an inflow port 37a of the oil filter 37. In the right case cover 25, an oil passage 25c, an oil reservoir 25d, and an oil passage 25e are continuously formed in this order from an outflow port 37b of the oil filter 37. An end portion of the oil passage 25e forms a communication port 25f which is communicated with the crankcase 20, thus being communicated with the communication port 20d (FIG. 5) of the crankcase 20.

As shown in FIG. 7, an oil passage 20e extends from the communication port 20d of the crankcase 20 toward the side of the cylinder body 21, and the oil passage 20e is connected to a mating surface oil passage 20f which is formed by cutting out, in a recessed shape, a mating surface of the crankcase 20 with the cylinder body 21.

As also shown in FIG. 7, the mating surface oil passage 20f is routed around the cylinder bore 21a and is formed so as to reach an area in the vicinity of one of the bolt holes 20a with which the stud bolt 26 positioned at a right rear side is in screw engagement. The mating surface oil passage 20f is connected to a communication passage 21c formed ranging from a mating surface of the cylinder body 21 with the crankcase 20 to other one of the bolt insertion holes 21b.

The bolt insertion holes 21b of the cylinder body 21 and the bolt insertion holes 22b of the cylinder head 22 are communicated with each other. End portions of the bolt insertion holes 22b formed in the cylinder head 22, on the side where the stud bolts 26 are inserted, are closed by head portions 26a of the stud bolts 26 when the stud bolts 26 are fastened. The bolt insertion holes 21b and 22b have a diameter greater than a diameter of the shaft portions 26b of the stud bolts 26. Accordingly, bolt insertion hole inner oil passages 101 which allow oil to pass therethrough are formed between the bolt insertion holes 21b and 22b and the shaft portions 26b of the stud bolts 26, respectively. The bolt insertion holes 21b and 22b used as the valve train oil supply passage 100 are formed on the side of one surface (side of a rear surface in this embodiment) of the cylinder body 21 and the cylinder head 22. The valve train oil supply passage 100 is lead to the intake cam shaft 60 and the exhaust cam shaft 70 disposed above the valve train oil supply passage 100 by making use of the bolt insertion holes 21b and 22b for fixing the cylinder body 21 and the cylinder head 22 to the crankcase 20.

Figure 8:
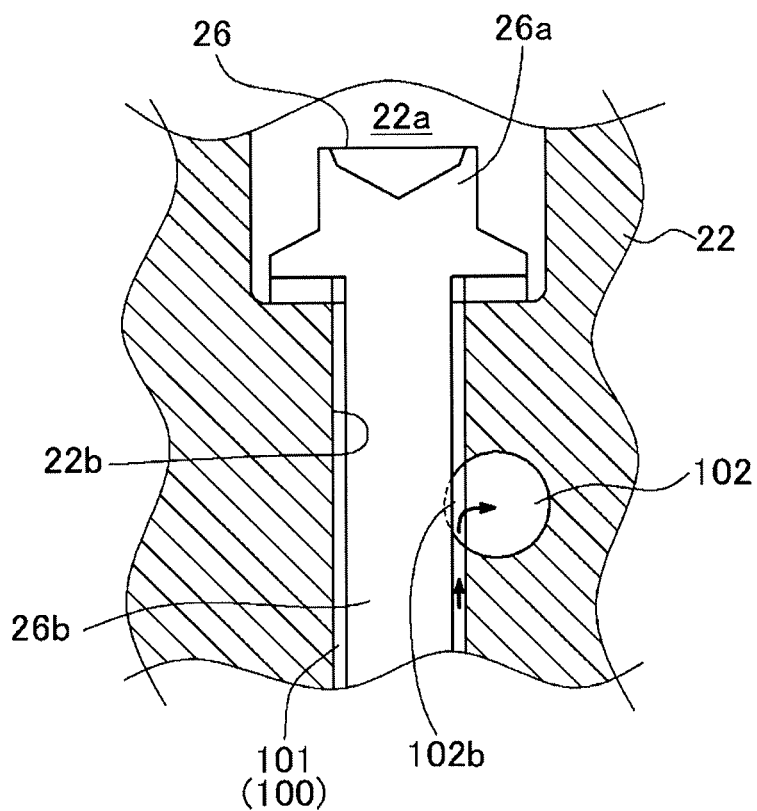
FIG. 8 is an enlarged sectional view of a part as viewed in a direction indicated by an arrow VIII-VIII in FIG. 7.
Figure 9:
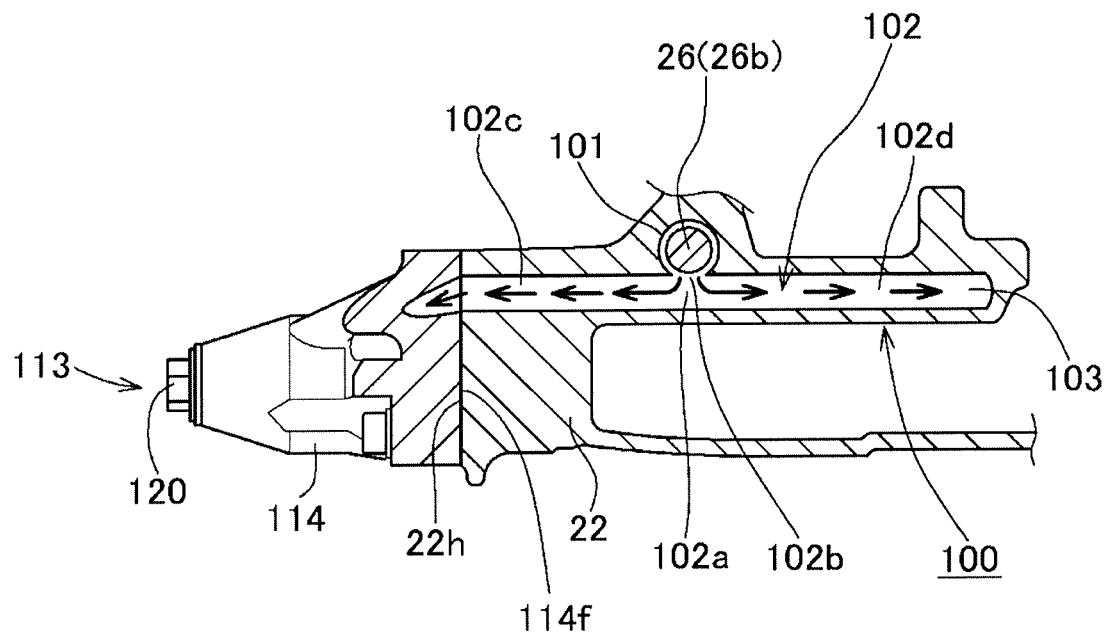
FIG. 9 is an enlarged sectional view of another part as viewed in a direction indicated by an arrow IX-IX in FIG. 5.

As shown in FIG. 5, a tensioner lifter mounting surface 22h, on which the tensioner lifter 113 is mounted, is formed on a rear surface of the cylinder head 22, and an oil passage 102 is formed in the cylinder head 22 such that the oil passage 102 extends frontward and obliquely upward from the tensioner lifter mounting surface 22h. As shown in FIGS. 8 and 9, an intermediate portion of the oil passage 102 in the longitudinal direction intersects with the bolt insertion hole inner oil passage 101 in a partially overlapping manner, and an intersecting portion of the oil passage 102 forms a communication port 102a through which the oil passage 102 is communicated with the bolt insertion hole inner oil passage 101. In the communication port 102a through which the oil passage 102 is communicated with the bolt insertion hole inner oil passage 101, the branching portion 102b is formed where the oil passage 102 is branched into the tensioner lifter oil supply passage 102c which extends rearward and through which oil is fed to the tensioner lifter 113 and a valve train side oil passage 102d which extends frontward and through which oil is fed to the intake cam shaft 60 and the exhaust cam shaft 70 of the valve train 50.

On a side close to the central portion of the cylinder head 22, a center oil passage 103 is formed such that the center oil passage 103 extends downward from a mating surface of the cylinder head cover 23 with the cam shaft holder 140. The valve train side oil passage 102d which forms a portion of the valve train oil supply passage 100 extends from the tensioner lifter oil supply passage 102c, passes the branching portion 102b, reaches an area close to the central portion of the cylinder head 22, and is communicated with the center oil passage 103. A front end portion of the valve train side oil passage 102d is connected to the center oil passage 103. An upper end of the center oil passage 103 communicates with a journal portion communicating oil passage 104 formed in the cam shaft holder 140.

Referring to FIG. 5, when power of the crankshaft 30 is transmitted to the oil pump 36 to operate the oil pump 36, oil reserved in the oil pan 24 flows from the strainer 35 through the oil passage 20b and is sucked into the oil pump 36. Oil discharged from the oil pump 36 and pressurized at a predetermined pressure, is delivered into the oil passage 25b, as shown in FIG. 6, through the communication port 25a formed in the right case cover 25, and then flows sequentially through the oil filter 37, the oil passage 25c, the oil reservoir 25d, and the oil passage 25e. Then the oil is fed to the communication port 20d disposed close to the cylinder body 21 of the crankcase 20 as shown in FIG. 5.

The oil fed to the communication port 20d passes though the oil passage 20e into the mating surface oil passage 20f, is fed into the bolt insertion hole 22b through the communication passage 21c in the cylinder body 21, flows through the bolt insertion hole inner oil passage 101, and is then fed into the cylinder head 22. More specifically, as shown in FIG. 5, the oil flows into the oil passage 102 through the communication port 102a of the bolt insertion hole inner oil passage 101, and the oil flow is divided in two flows at the branching portion 102b. One of the divided flows is fed through the tensioner lifter oil supply passage 102c into the tensioner lifter 113, and the other divided flow is fed through the valve train side oil passage 102d into the center oil passage 103 and then fed to the valve train 50.

As shown in FIG. 5, the tensioner lifter 113 of the cam chain tensioner device 110, to which oil is supplied from the tensioner lifter oil supply passage 102c, is mounted on the tensioner lifter mounting surface 22h formed on the rear surface of the cylinder head 22. As will be noted from FIGS. 4 and 5, the tensioner lifter mounting surface 22h is formed in an inclined direction opposite to a direction in which the cylinder axis L is inclined. In FIG. 5, a plane P indicates a plane including the tensioner lifter mounting surface 22h.

Figure 10:
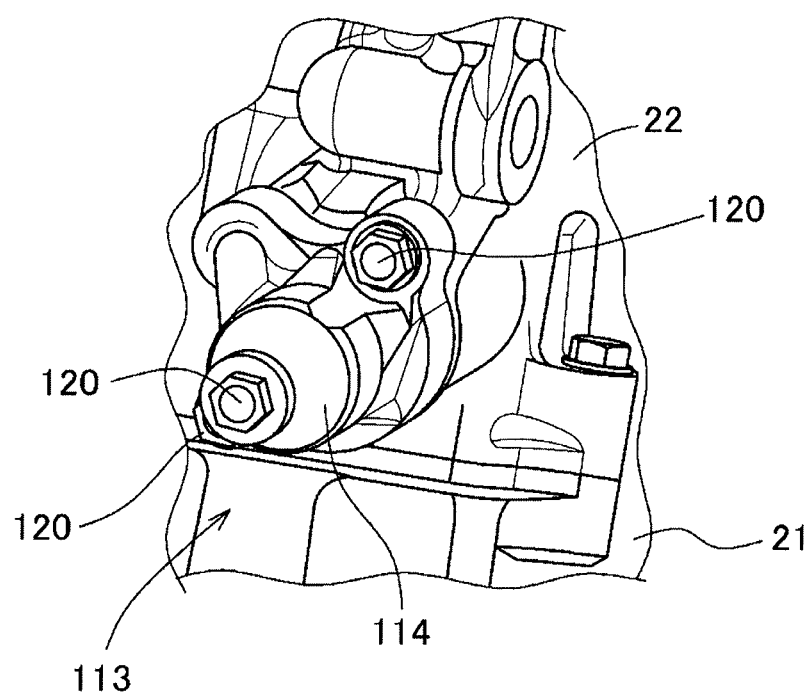
FIG. 10 is an enlarged perspective view of a part of the internal combustion engine around a tensioner lifter as viewed from an oblique right and rear side.
Figure 11:
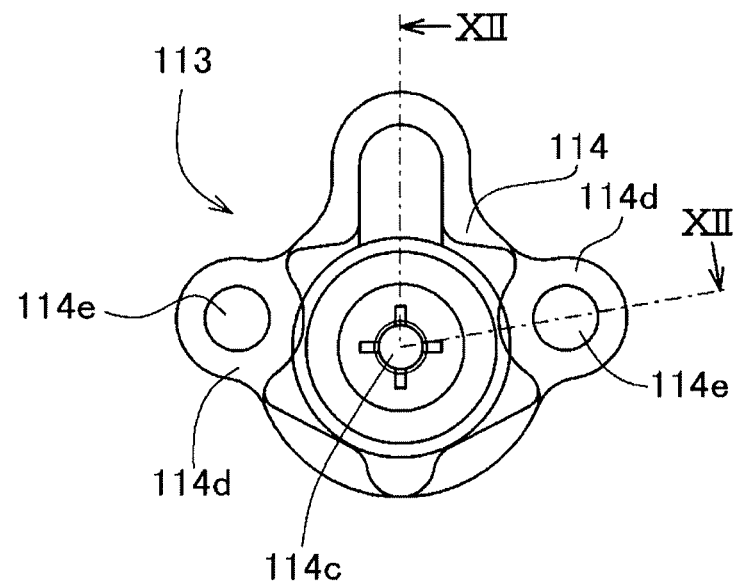
FIG. 11 is a view of the tensioner lifter as viewed from a rear side of the tensioner lifter.
Figure 12:
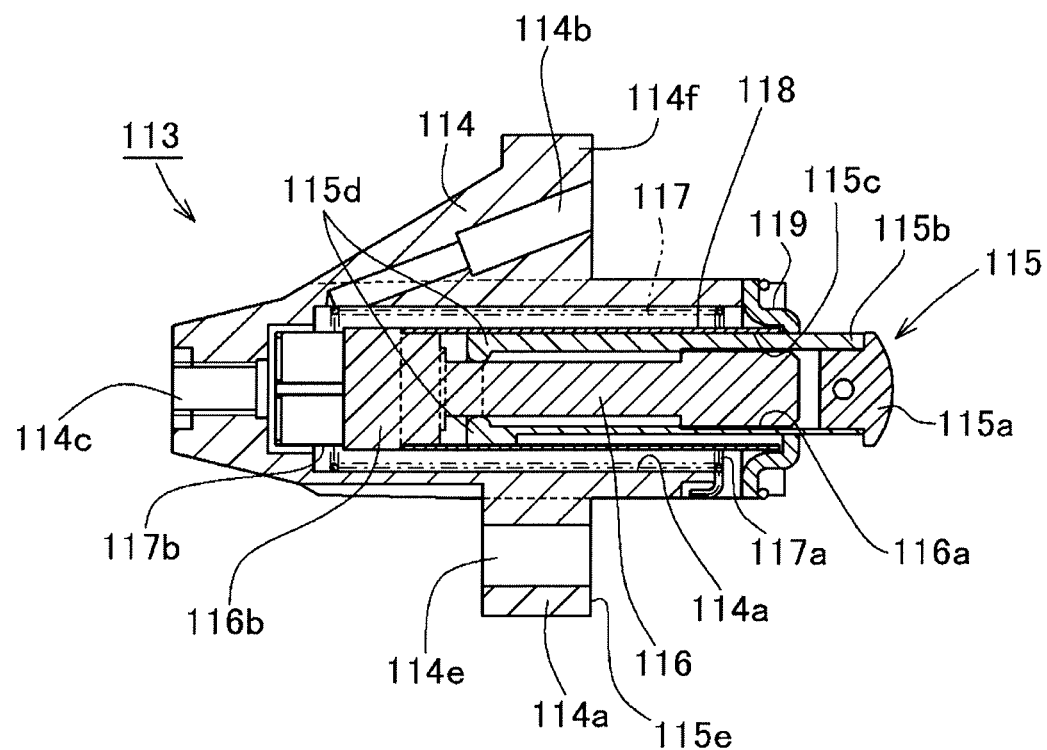
FIG. 12 is a sectional view of the tensioner lifter as viewed in a direction indicated by an arrow XII-XII in FIG. 11.

As shown in FIGS. 10, 11 and 12, the tensioner lifter 113 includes: a tensioner body 114 forming an outer shell of the tensioner lifter 113; and a plunger 115 having a distal end for pressing the cam chain tensioner 111. A plunger accommodating hole 114a in which the plunger 115 is accommodated is formed in the tensioner body 114. Flange portions 114d are formed to be positioned on left and right sides of the plunger accommodating hole 114a. A bolt insertion hole 114e is formed in each of the flange portions 114d. On a front surface of the tensioner body 114 is formed a mounting surface 115e which is brought into contact with the tensioner lifter mounting surface 22h of the cylinder head 22.

A male threaded member 116 is inserted into the plunger accommodating hole 114a of the tensioner body 114. The male threaded member 116 is formed in a circular columnar shape having a stepped portion with a rear end side having a larger diameter and a distal end side having a smaller diameter. The distal end side forms a male threaded portion 116a on which male threads are formed.

A torsion coil spring 117 is inserted in the plunger accommodating hole 114a, a rear end 117b of the torsion coil spring 117 is fixedly mounted on a rear end portion 116b of the male threaded member 116, and the other end 117a of the torsion coil spring 117 is fixed to a front side of the tensioner body 114.

The plunger 115 for pressing the cam chain tensioner 111 of the cam chain tensioner device 110 is inserted in the plunger accommodating hole 114a formed in the tensioner body 114. The plunger 115 includes: a cylindrical member 115b in which a front portion of the male threaded member 116 is inserted; and a pressing member 115a fitted in a distal end of the cylindrical member 115b to press the cam chain tensioner 111. A female threaded portion 115c in screw engagement with the male threaded portion 116a of the male threaded member 116 is formed on an inner side of the cylindrical member 115b. A stopper portion 115d for preventing axial removal of the plunger 115 is formed on a rear end of the cylindrical member 115b in a radially inwardly projecting manner.

A cylindrical collar member 118 is fitted on the plunger 115 so as to extend to a region to cover the stepped portion of the male threaded member 116, the plunger 115 is inserted in a plunger insertion hole formed in a cap member 119, and the cap member 119 is fixed to the tensioner body 114. The plunger 115 is formed such that advancing and retracting movement of the plunger 115 are allowable but rotation of the plunger 115 is restricted by the cap member 119.

A tool insertion hole 114c is formed in a rear end of the tensioner body 114. A tool to be inserted in the tool insertion hole 114c is a tool for rotating the male threaded member 116. When the tool (not shown) for rotating the male threaded member 116 is inserted into the tool insertion hole 114c and the male threaded member 116 is rotated in a predetermined direction, the plunger 115 is retracted to the inside of the tensioner body 114, and, at the same time, the torsion coil spring 117 is twisted. In such a state, the pressing member 115a of the plunger 115 of the tensioner lifter 113 is directed toward the cam chain tensioner 111 and is brought into contact with the cam chain tensioner 111, while, at the same time, the mounting surface 114f of the tensioner body 114 is brought into contact with the tensioner lifter mounting surface 22h which forms the rear surface of the cylinder head 22. Then, bolts 120 (FIG. 10) are inserted into the bolt insertion holes 114e formed in the tensioner body 114 of the tensioner lifter 113, and the bolts 120 are tightened perpendicularly to the tensioner lifter mounting surface 22h so that the tensioner lifter 113 is fixedly mounted on the cylinder head 22. As shown in FIG. 5, bolt holes 22i formed in the cylinder head 22 for screw engagement with the bolts 120 and the tensioner lifter oil supply passage 102c are formed parallel to each other. By arranging the bolt holes 22i and the tensioner lifter oil supply passage 102c in the same direction, machinability can be improved.

When the tool for rotating the male threaded member 116 is removed after the tensioner lifter 113 is mounted on the cylinder head 22, the restoring force of the torsion coil spring 117 operates to rotate the male threaded member 116, and, at the same time, the plunger 115 having the female threaded portion 115c in screw engagement with the male threaded member 116 advances toward the cam chain tensioner 111 thus pressing the cam chain tensioner 111. As shown in FIGS. 9 and 10, another bolt 120 is threadedly engaged in the tool insertion holes 114c to close the tool insertion holes 114c.

Next, description will be made with respect to the valve train 50 which includes the intake cam shaft 60 and the exhaust cam shaft 70 to which oil is fed through the valve train oil supply passage 100, and through oil passages formed in the valve train 50.

Figure 14:
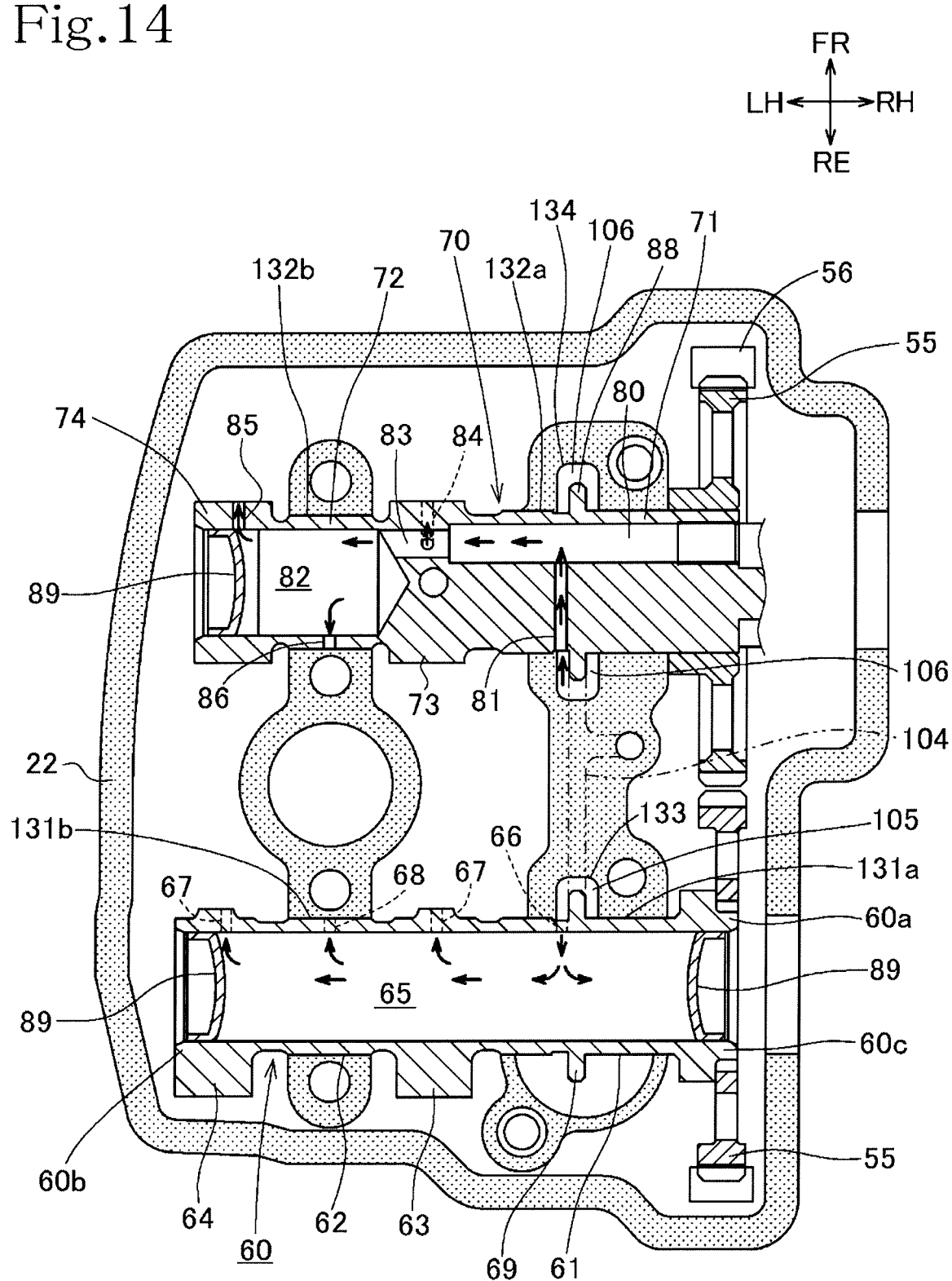
FIG. 14 is a sectional view of the internal combustion engine as viewed in a direction indicated by an arrow XIV-XIV in FIG. 7.

The intake cam shaft 60 for closing and opening the intake valves 40 is shown in FIGS. 13 and 14. A first bearing journal portion 61 supported by the cylinder head 22 is formed on a right end portion 60a of the intake cam shaft 60, and a second bearing journal portion 62 is formed on a left end portion 60b of the intake cam shaft 60. A first intake cam 63 and a second intake cam 64, forming valve operating cam portions, are integrally formed with the intake cam shaft 60. The second intake cam 64 is formed on the left end portion 60b of the intake cam shaft 60, and the first intake cam 63 is disposed at a position between the first bearing journal portion 61 and the second bearing journal portion 62. An input sprocket mounting portion 60c is formed on a right end portion 60a of the intake cam shaft 60, and an input sprocket 55 for driving the intake cam shaft 60 is mounted on the input sprocket mounting portion 60c.

The intake cam shaft 60 is formed of a hollow sleeve-shaped member, the right end portion 60a and the left end portion 60b of the intake cam shaft 60 are closed by fitting closing members 89 into each of the right end portion 60a and the left end portion 60b. An intake cam shaft inner oil passage 65 is formed in the intake cam shaft 60 and oil passes through the intake cam shaft inner oil passage 65. An annular flange portion 69 is formed on the first bearing journal portion 61, the portion 69 protruding in a flange shape in radial directions to restrict movement of the intake cam shaft 60 in the thrust direction.

As shown in FIG. 13, the first bearing journal portion 61 of the intake cam shaft 60 has an intake cam shaft supply passage 66 communicating with the intake cam shaft inner oil passage 65, and the intake cam shaft supply passage 66 is disposed adjacent to the flange portion 69. In the second bearing journal portion 62 is formed a journal bearing oil supply passage 68 communicating with the intake cam shaft inner oil passage 65, and oil is fed from within the intake cam shaft 60 to an outer peripheral surface of the second bearing journal portion 62.

In each of the first intake cam 63 and the second intake cam 64 is formed a cam surface oil supply passage 67 which extends from within the intake cam shaft inner oil passage 65a to the cam surface. Oil is fed from within the intake cam shaft 60 to the cam surface of the first intake cam 63 and to the cam surface of the second intake cam 64.

The exhaust cam shaft 70 for opening and closing the exhaust valves 41 is shown in FIGS. 17 to 21.

Figure 21:
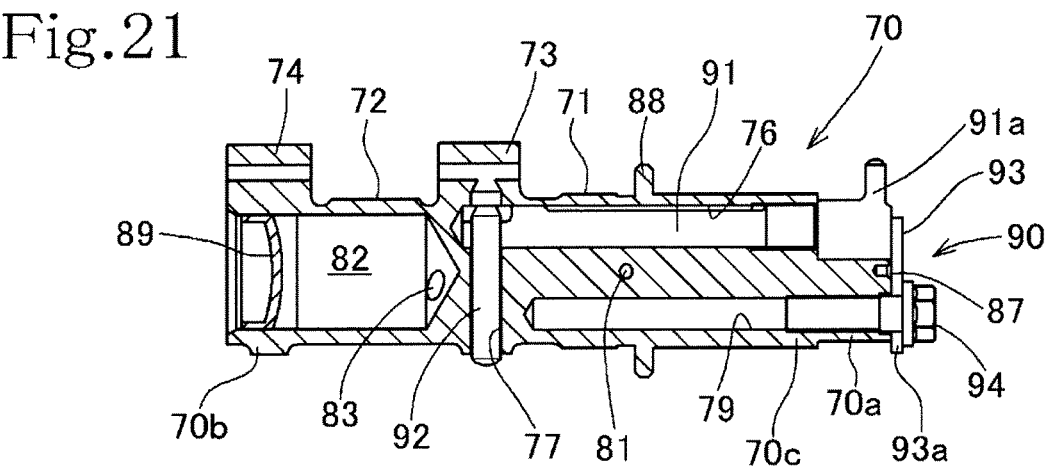
FIG. 21 is a view showing a configuration where a decompression device is mounted on the exhaust cam shaft shown in FIG. 17.

As shown in FIG. 21, the exhaust cam shaft 70 includes a centrifugal decompression device 90 which makes use of rotation of the exhaust cam shaft 70. The decompression device 90 includes: a decompression shaft 91 on which a decompression weight 91a is integrally formed; a decompression pin 92 which advances or retracts from a cam surface of an exhaust cam 73 to be described later in connection with rotation of the decompression shaft 91; and a torsion coil spring (not shown) which biases the decompression shaft 91 in a rotational direction.

The decompression shaft 91 is constantly biased by the torsion coil spring in a direction in which the decompression weight 91a is brought into contact with a decompression weight swing restricting portion 78, to be described later, formed on the exhaust cam shaft 70. In such a state, the decompression pin 92 so protrudes from the cam surface of the exhaust cam 73 to bring about a decompression state in which the exhaust valve 41 is so released that pressure is lowered even when the internal combustion engine E is in the compression stroke. That is, when a rotational speed of the exhaust cam shaft 70 is equal to or below a predetermined rotational speed at the time of starting the internal combustion engine E, the decompression device 90 is brought into the above-mentioned decompressed state.

When the internal combustion engine E is started and a rotational speed of the exhaust cam shaft 70 becomes equal to or more than the predetermined rotational speed, the decompression weight 91a moves outward from the exhaust cam shaft 70 due to a centrifugal force, and retracts the decompression pin 92 by rotating the decompression shaft 91 against the biasing force of the torsion coil spring, thus bringing the decompression device 90 into a non-decompressed state from the decompressed state.

The configuration of the exhaust cam shaft 70 will be described hereinafter. As shown in FIGS. 13 and 14, the exhaust cam shaft 70 has a first bearing journal portion 71 supported by the cylinder head 22 and disposed close to the right end portion 70a, and a second bearing journal portion 72 on a left end portion 70b of the exhaust cam shaft 70. The right first bearing journal portion 71 has a diameter $d_1$ set greater than a diameter $d_2$ of the left second bearing journal portion 72.

In addition to the exhaust cam 73, i.e., the first exhaust cam 73, a second exhaust cam 74 is provided on the exhaust cam shaft 70. The first and second exhaust cams 73 form the valve operating cam portions integrally formed on the exhaust cam shaft 70. The second exhaust cam 73 is positioned on a left end portion 70b of the exhaust cam shaft 70, and the first exhaust cam 73 is formed at a position between the first bearing journal portion 71 and the second bearing journal portion 72. On the first bearing journal portion 71 is formed a flange portion 88 which protrudes in a flange shape in radial directions to restrict the movement of the exhaust cam shaft 70 in the thrust direction. An input sprocket mounting portion 70c is formed on a right end portion 70a of the exhaust cam shaft 70, and the input sprocket 55 for driving the exhaust cam shaft 70 is mounted on the input sprocket mounting portion 70c.

Figure 17:
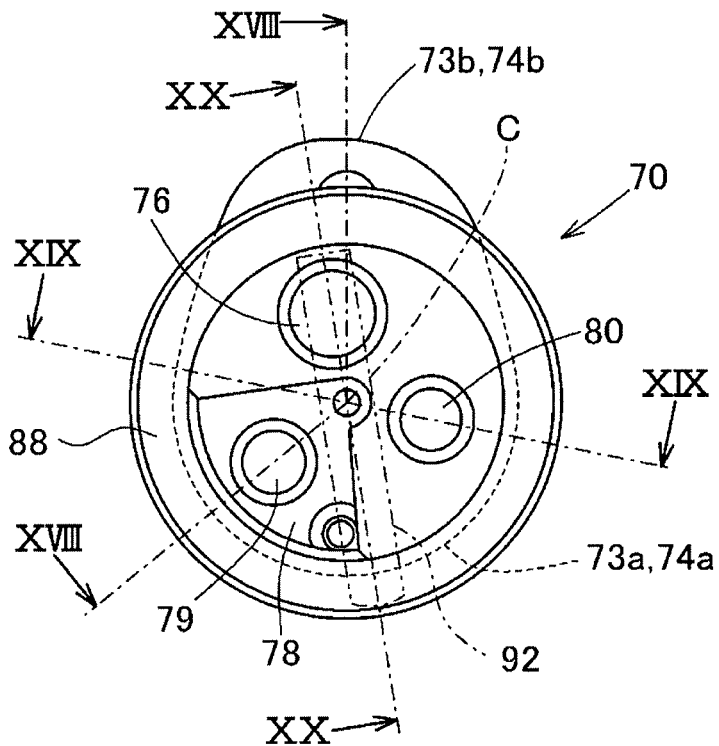
FIG. 17 is a right side view of the exhaust cam shaft.

As shown in FIG. 17, the first exhaust cam 73 and the second exhaust cam 74 include: base circle portions 73a and 74a of a circular arc shape about an axis of the exhaust cam shaft 70, respectively; and cam crest portions 73b and 74b which are respectively continuously formed with the base circle portions 73a and 74a to radially outwardly protruding manner from the base circle portions 73a and 74a. As shown in FIG. 3, the first intake cam 63 and the second intake cam 64 are formed in the same manner as the first exhaust cam 73 and the second exhaust cam 74. That is, the first intake cam 63 and the second intake cam 64 include: base circle portions 63a and 64a of a circular arc shape about an axis of the intake cam shaft 60; and cam crest portions 63b and 64b which are respectively continuously formed with the base circle portions 63a and 64a in a radially outwardly protruding manner than the base circle portions 63a and 64a.

Figure 18:
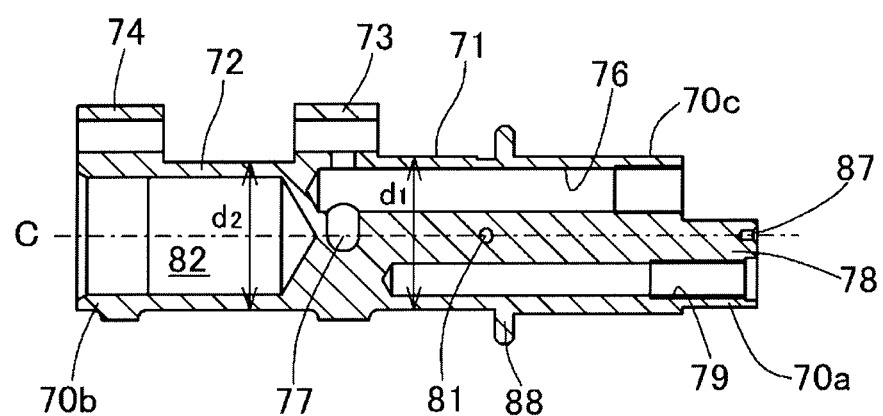
FIG. 18 is a sectional view of the exhaust cam shaft as viewed in a direction indicated by an arrow XVIII-XVIII in FIG. 17.

As shown in FIGS. 17 and 18, on the right end portion 70a of the exhaust cam shaft 70 is formed the decompression weight swing restricting portion 78, which is of a sector shape in cross section and is formed in a protruding manner in an area offset from the axis C of the exhaust cam shaft 70. As FIG. 21 shows, the decompression weight 91a integrally formed with the decompression shaft 91 which is biased by the torsion coil spring is brought into contact with a side surface of the decompression weight swing restricting portion 78. The decompression weight swing restricting portion 78 restricts rotation of the decompression weight 91a. On the decompression weight swing restricting portion 78 is formed a center hole portion 87 which is used as a reference in machining the exhaust cam shaft 70.

Figure 20:
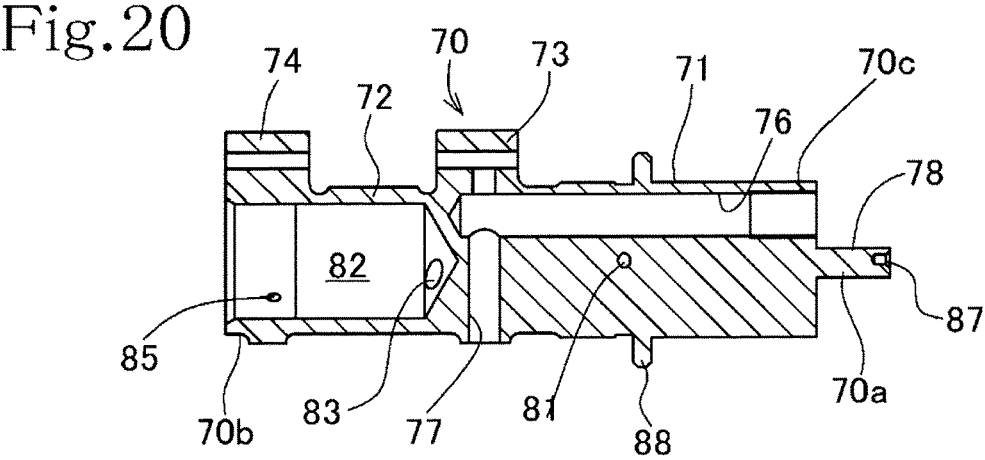
FIG. 20 is a sectional view of the exhaust cam shaft as viewed in a direction indicated by an arrow XX-XX in FIG. 17.

As shown in FIGS. 18 and 20, a decompression shaft hole 76, in which the decompression shaft 91 of the decompression device 90 is inserted, is formed in the exhaust cam shaft 70. The decompression shaft hole 76 extends to an area between the first bearing journal portion 71 and the second bearing journal portion 72 in an axial direction toward the first exhaust cam 73 from the right end portion 70a adjacent to the portion on which the input sprocket 55 is mounted. The decompression shaft hole 76 is formed in parallel to the axis C of the exhaust cam shaft 70. As shown in FIG. 17, the decompression shaft hole 76 is disposed at a position offset from the axis C of the exhaust cam shaft 70.

As shown in FIG. 18, a decompression shaft removal preventing threaded portion 79 is formed in the decompression weight swing restricting portion 78 parallel to the decompression shaft hole 76. As FIG. 21 shows, a bolt 94 for preventing removal of the decompression shaft 91 is engaged with the decompression shaft removal preventing threaded portion 79.

As shown in FIG. 17, the decompression shaft removal preventing threaded portion 79 is formed in an offset manner from the axis C of the exhaust cam shaft 70 as viewed in the axial direction of the exhaust cam shaft 70 and is positioned at an approximately center of the decompression weight swing restricting portion 78. The decompression shaft removal preventing threaded portion 79 is formed to have a through hole formed in the first bearing journal portion 71. As shown in FIG. 21, after the decompression shaft 91 is inserted into the decompression shaft hole 76, a plate-like decompression shaft removal preventing member 93 is brought into contact with the decompression shaft 91 from the right side, a bolt 94 is inserted into the bolt insertion hole 93a formed in the decompression shaft removal preventing member 93, and the bolt 94 is engaged in and tightened with the decompression shaft removal preventing threaded portion 79, thus preventing removal of the decompression shaft 91.

Figure 19:
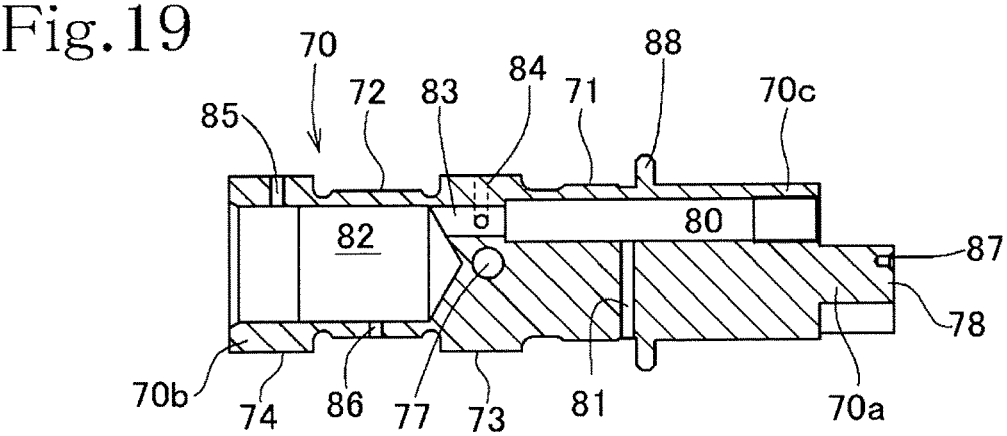
FIG. 19 is a sectional view of the exhaust cam shaft as viewed in a direction indicated by an arrow XIX-XIX in FIG. 17.

As shown in FIGS. 17 to 19, an exhaust cam shaft inner oil passage 80 extending parallel to the decompression shaft hole 76 is formed in the exhaust cam shaft 70. The exhaust cam shaft inner oil passage 80 extends from a right end portion 70a toward a left end portion 70b of the exhaust cam shaft 70. The exhaust cam shaft inner oil passage 80 is provided for supplying lubricant oil from the first bearing journal portion 71 to the second bearing journal portion 72. As shown in FIG. 17, the exhaust cam shaft inner oil passage 80 is disposed on the other side of the decompression shaft removal preventing threaded portion 79 with respect to the decompression pin 92, as viewed in the axial direction of the exhaust cam shaft 70.

Referring to FIG. 19, an oil reservoir 82 for reserving oil therein is formed in the exhaust cam shaft 70. The oil reservoir 82 extends rightward from a left end surface of the exhaust cam shaft 70. The oil reservoir 82 extends axially to an area in the vicinity of the first exhaust cam 73, and an opening portion formed on a left end of the reservoir 82 is closed by a closing member 89. The oil reservoir 82 and the exhaust cam shaft inner oil passage 80 are communicated with each other through a communication passage 83.

As shown in FIG. 19, the first bearing journal portion 71 of the exhaust cam shaft 70 has therein an exhaust cam shaft oil supply passage 81 adjacent to the flange portion 88. The exhaust cam shaft oil supply passage 81 is communicated with the exhaust cam shaft inner oil passage 80. Further, a journal bearing oil supply passage 86 is formed in the second bearing journal portion 72, so as to communicate with the oil reservoir 82, and oil is fed from inside of the exhaust cam shaft 70 to an outer peripheral surface of the second bearing journal portion 72.

A cam surface oil supply passage 84 is formed in the first exhaust cam 73 to extend from a cam surface of the first exhaust cam 73 to the communication passage 83. A cam surface oil supply passage 85 is formed in the second exhaust cam 74 to extend from a cam surface of the second exhaust cam 74 to communicate with the oil reservoir 82. Due to the formation of the cam surface oil supply passages 84 and 85, oil is fed from inside of the exhaust cam shaft 70 to the cam surfaces of the first exhaust cam 73 and the second exhaust cam 74.

The above-mentioned intake cam shaft 60 and the exhaust cam shaft 70 are rotatably supported as follows. That is, as shown in FIG. 5, the intake cam shaft 60 is placed on a head-side intake journal receiving portion 131 formed on the cylinder head 22, and the exhaust cam shaft 70 is placed on a head-side exhaust journal receiving portion 132 formed on the cylinder head 22. The intake cam shaft 60 and the exhaust cam shaft 70 are held by the respective cam shaft holders 140 such that a holder-side intake journal receiving portion 141 and a holder-side exhaust journal receiving portion 142 formed on the cam shaft holder 140 are in contact with the intake cam shaft 60 and the exhaust cam shaft 70, respectively. Then, the cam shaft holders 140 are fixed to the cylinder head 22 using bolts 145. As shown in FIG. 13, the intake cam shaft 60 and the exhaust cam shaft 70 are disposed parallel to each other with the center of the cylinder head 22 sandwiched therebetween as viewed in a direction of a cylinder axis L.

As shown in FIG. 14, the head-side intake journal receiving portion 131 is formed of: a first head-side intake journal receiving portion 131a which supports the first bearing journal portion 61 of the intake cam shaft 60; and a second head-side intake journal receiving portion 131b which supports the second bearing journal portion 62. The head-side exhaust journal receiving portion 132 is formed of: a first head-side exhaust journal receiving portion 132a which supports the first bearing journal portion 71 of the exhaust cam shaft 70; and a second head-side exhaust journal receiving portion 132b which supports the second bearing journal portion 72.

Figure 15:
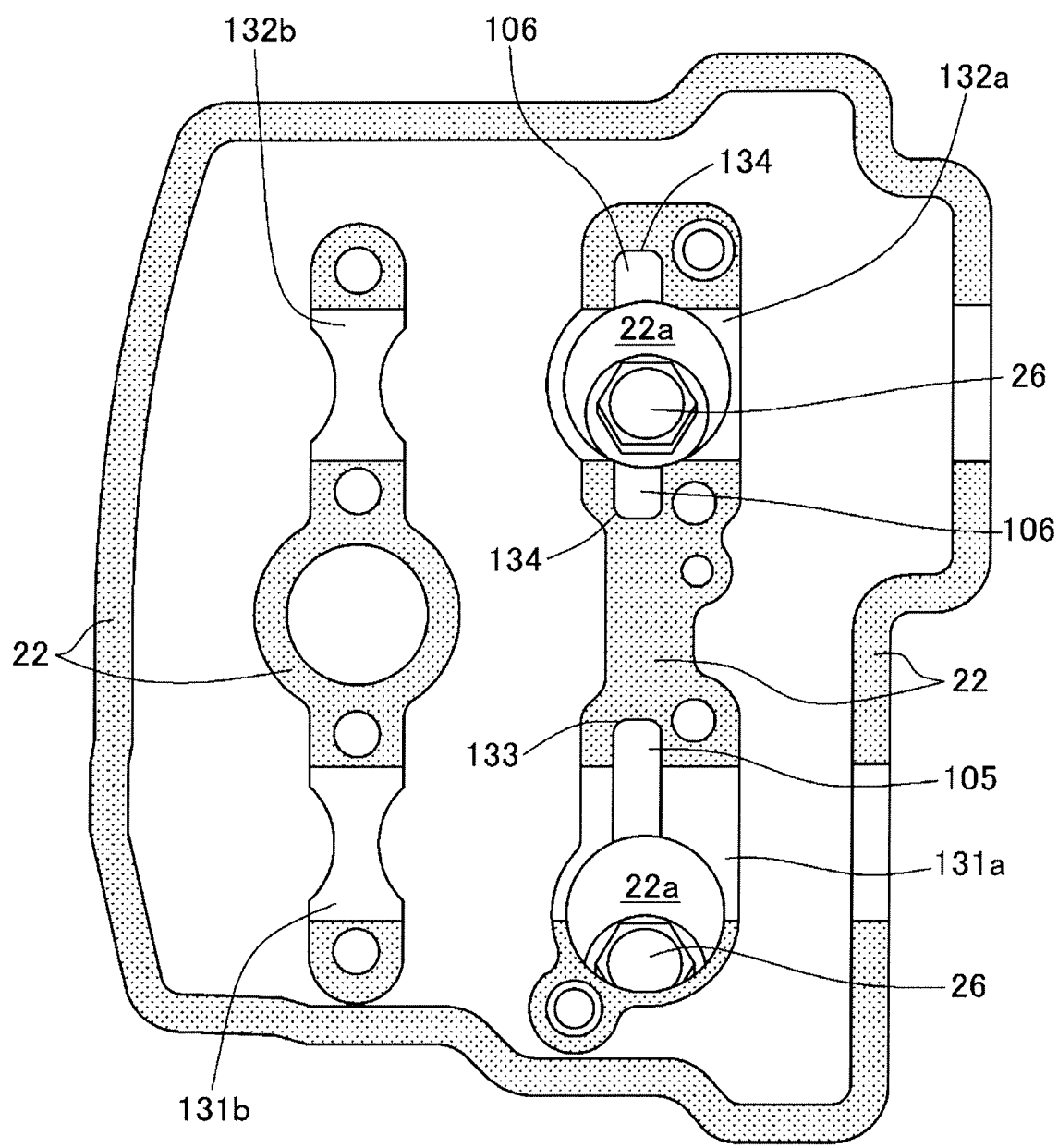
FIG. 15 is a view showing a configuration where an intake cam shaft and an exhaust cam shaft are removed from the configuration shown in FIG. 14.
Figure 16:
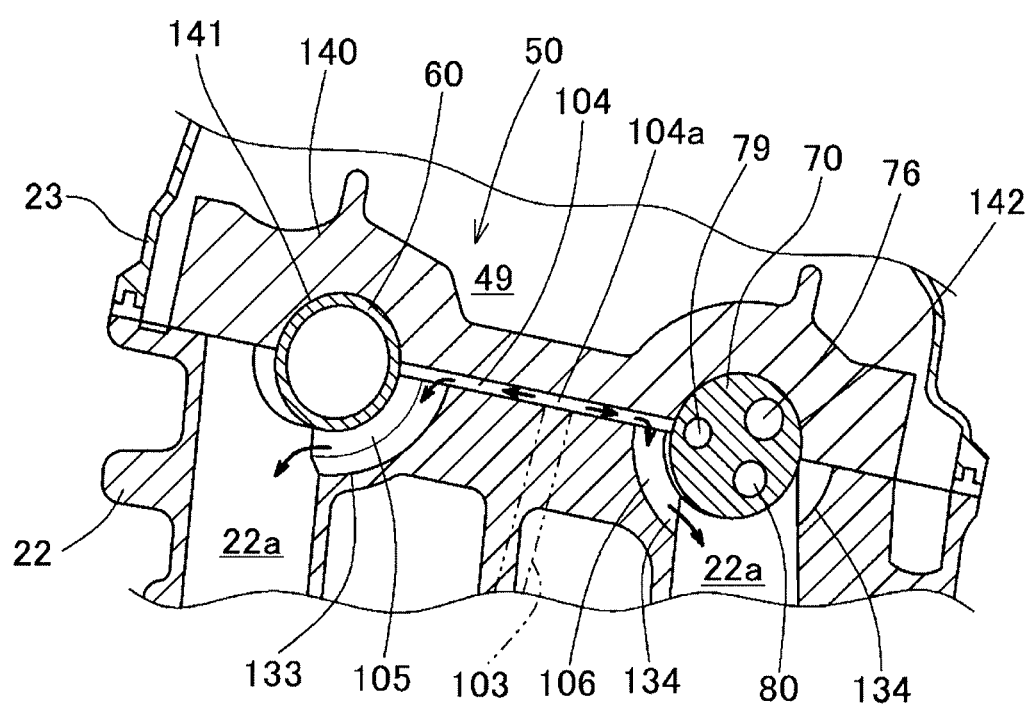
FIG. 16 is a longitudinal cross-sectional view of the internal combustion engine taken along a line XVI-XVI in FIG. 13.

As shown in FIGS. 14 to 16, a recessed portion 133 is formed in the first head-side intake journal receiving portion 131a such that a gap is left in the recessed portion 133 between the first head-side intake journal receiving portion 131a and the flange portion 69 of the intake cam shaft 60. The recessed portion 133 is communicated with the bolt accommodating hole 22a disposed below the first head-side intake journal receiving portion 131a. A recessed portion 134 is also formed in the first head-side exhaust journal receiving portion 132a such that a gap is left between the first head-side exhaust journal receiving portion 132a and the flange portion 88 of the exhaust cam shaft 70. The recessed portion 134 is communicated with the bolt accommodating hole 22a disposed below the first head-side exhaust journal receiving portion 132a.

Next, the cam shaft holders 140 will be described. FIG. 13 is a cross-sectional view of the internal combustion engine as viewed in a direction indicated by an arrow XIII-XIII in FIG. 7. The cam shaft holders 140 are shown in a section taken parallel to the mating surface between the cam shaft holders 140 and the cylinder head 22.

As shown in FIG. 5, the holder-side intake journal receiving portion 141 and the holder-side exhaust journal receiving portion 142 are formed on lower surfaces of the cam shaft holders 140. As shown in FIG. 13, the holder-side intake journal receiving portion 141 is formed of a first holder-side intake journal receiving portion 141a which supports the first bearing journal portion 61 of the intake cam shaft 60, and a second holder-side intake journal receiving portion 141b which supports the second bearing journal portion 62 of the intake cam shaft 60. The holder-side exhaust journal receiving portion 142 is formed of a first holder-side exhaust journal receiving portion 142a which supports the first bearing journal portion 71 of the exhaust cam shaft 70, and a second holder-side exhaust journal receiving portion 142b which supports the second bearing journal portion 72 of the exhaust cam shaft 70.

In the first holder-side intake journal receiving portion 141a is formed a thrust restricting recessed portion 143 in which the flange portion 69 is fitted. The thrust restricting recessed portion 143 is formed by cutting out the first holder-side intake journal receiving portion 141a into a semicircular shape having the same width as the flange portion 69 of the intake cam shaft 60, thus restricting movement of the intake cam shaft 60 in the thrust direction. In the first holder-side exhaust journal receiving portion 142a is formed a thrust restricting recessed portion 144 in which the flange portion 88 is fitted. The thrust restricting recessed portion 144 is formed by cutting out the first holder-side exhaust journal receiving portion 142a into a semicircular shape having the same width as the flange portion 88 of the exhaust cam shaft 70, thus restricting movement of the exhaust cam shaft 70 in the thrust direction.

As shown in FIG. 5, the journal portion communicating oil passage 104, which communicates with an upper end of the center oil passage 103 of the valve train oil supply passage 100, is formed on a lower surface of the cam shaft holder 140. As shown in FIG. 13, the journal portion communicating oil passage 104 is formed to extend parallel to the exhaust cam shaft 70, from an end portion thereof communicating with the center oil passage 103. The journal portion communicating oil passage 104 is branched in a direction toward the intake cam shaft 60 and in a direction toward the exhaust cam shaft 70. As FIG. 13 shows, an end portion of the journal portion communicating oil passage 104 extending in the direction to the intake cam shaft 60 is connected to the thrust restricting recessed portion 143. As shown in FIGS. 14 and 16, the end portion of the journal portion communicating oil passage 104 is communicated with an intake journal receiving portion oil passage 105 in the recessed portion 133. As shown in FIG. 13, an end portion of the journal portion communicating oil passage 104 extending in the direction to the exhaust cam shaft 70 is connected to the thrust restricting recessed portion 144. As shown in FIGS. 14 and 16, the end portion of the journal portion communicating oil passage 104 is communicated with an exhaust journal receiving portion oil passage 106 in the recessed portion 134.

The oil passage to the intake cam shaft 60 and the oil passage to the exhaust cam shaft 70 are formed as described above. Accordingly, oil pressurized to a predetermined pressure is fed to the respective portions by the oil pump 36 through the valve train oil supply passages 100 as follows.

The oil passes from the oil pump 36 through the bolt insertion hole inner oil passage 101 (FIG. 7), the valve train side oil passage 102d (FIG. 5), and the center oil passage 103. Then, as shown in FIG. 13, the oil flows from the upper end of the center oil passage 103 through a branching portion 104a of the journal portion communicating oil passage 104 to the intake cam shaft 60, and, as shown in FIG. 16, the oil is fed to the intake journal receiving portion oil passage 105. The oil fed to the intake journal receiving portion oil passage 105 is reserved in the bolt accommodating hole 22a, and as shown in FIG. 14, the oil flows into the intake cam shaft 60 through the intake cam shaft supply passage 66 so that the oil is supplied from the cam surface oil supply passages 67 to the cam surfaces of the intake cams 63 and 64. The oil is supplied also to the second head-side intake journal receiving portion 131b through the journal bearing oil supply passage 68.

As shown in FIG. 13, oil flowing from the branching portion 104a of the journal portion communicating oil passage 104 to the exhaust cam shaft 70 is fed to the exhaust journal receiving portion oil passage 106 as shown in FIG. 16. Oil which is fed to the exhaust journal receiving portion oil passage 106 is reserved in the bolt accommodating hole 22a, and flows into the exhaust cam shaft 70 through the exhaust cam shaft oil supply passage 81 disposed adjacent to the flange portion 88 of the exhaust cam shaft 70 as shown in FIG. 14 so that the oil is supplied to the cam surfaces of the exhaust cams 73 and 74 through the cam surface oil supply passages 84 and 85, and the oil is supplied to the second head-side exhaust journal receiving portion 132b through the journal bearing oil supply passage 86.

According to this embodiment having the above-mentioned configuration, following advantageous effects can be acquired.

The internal combustion engine E is configured such that the cylinder body 21 and the cylinder head 22 are disposed in the upper portion of the crankcase 20 with the cylinder axis L inclined with respect to the vertical direction. The internal combustion engine E includes the cam chain 56 for transmitting power from the crankshaft 30 to the intake cam shaft 60 and the exhaust cam shaft 70, and the cam chain tensioner device 110 presses the cam chain 56, the cam chain tensioner device 110 includes the cam chain tensioner 111 swingably supported by the crankcase 20 and pressing the cam chain 56. The tensioner lifter 113 presses the cam chain tensioner 111, and the tensioner lifter 113 is disposed on the side surface of the cylinder head 22 which forms an inclined upper surface of the cylinder head 22 so as to be directed toward the cam chain 56, and the engine E includes the valve gear oil supply passage 100 for supplying oil from the oil pump 36 to the intake cam shaft 60 and the exhaust cam shaft 70. The tensioner lifter oil supply passage 102c supplies oil to the tensioner lifter 113, the valve gear oil supply passage 100 has the branching portion 102b where the tensioner lifter oil supply passage 102c branches, and the branching portion 102b is branches at a position higher than the tensioner lifter 113 and communicates with the tensioner lifter 113 disposed at a position lower than the branching portion 102. Accordingly, at the time of stopping the internal combustion engine E, outflow of oil from inside the tensioner lifter 13 is reduced so that oil is retained in the tensioner lifter 113, whereby the tensioner lifter 113 can sufficiently press the cam chain tensioner 111 at the time of restarting the engine E. Accordingly, noise of the cam chain 56 can be reduced by preventing fluttering of the cam chain 56.

Further, the valve gear oil supply passage 100 is led to the intake cam shaft 60 and the exhaust cam shaft 70 above the valve gear oil supply passage 100 by using bolt insertion holes 21b and 22b for fixing the cylinder body 21 and the cylinder head 22 to the crankcase 20, and the branching portion 102b is formed in an intersecting manner with the bolt insertion holes 21b and 22b. Accordingly, by using the bolt insertion holes 21b and 22b as the valve gear oil supply passages 100 and by making the bolt insertion holes 21b and 22b forming the valve gear oil supply passage 100 and the tensioner lifter oil supply passage 102c intersect with each other, to thus form the branching portion 102b, it is possible to enhance machining productivity of the engines.

The cylinder head 22 has a tensioner lifter mounting surface 22h inclined in a direction opposite to the inclination of the cylinder axis L of the cylinder portion 22, and the tensioner lifter 113 is mounted on the cylinder head 22 by bolts 120 directed perpendicular to the tensioner lifter mounting surface 22h, and the tensioner lifter oil supply passage 102c is arranged parallel to the bolts 120. Accordingly, the tensioner lifter oil supply passage 102c and the bolt hole 22i with which the bolts 120 threadedly engage are oriented in the same direction so that machinability is enhanced.

Further, the bolt insertion holes 21b and 22b used as the valve gear oil supply passage 100 are formed along one side surface of the cylinder body 21 and cylinder head 22, the center oil passage 103 forming a portion of the valve gear oil supply passage 100 is disposed adjacent to the center of the cylinder head 22, and the valve-gear-side oil passage 102d forming a portion of the valve gear oil supply passage 100 extends from the tensioner lifter oil supply passage 102c to a portion of the cylinder head 22 adjacent to the center of the cylinder head 22 through the branching portion 102b, and the valve-gear-side oil supply passage 102c communicates with the center oil passage 103. Accordingly, return oil from the side of the valve gear can be used as oil for maintaining lubrication property of the tensioner lifter 113. Accordingly, even when a long time period elapses from stopping of the internal combustion engine E to restarting of the same, a good lubrication ability of the tensioner lifter 113 can be maintained.

Further, as viewed in the direction of the cylinder axis L, the intake camshaft 60 with the first intake cam 63 and the second intake cam 64 and the exhaust camshaft 70 with the first exhaust cam 73 and the second exhaust cam 74, are arranged parallel to each other with the center of the cylinder portion 22 positioned therebetween, and the journal portion communicating oil passage 104 for supplying oil to the intake camshaft 60 and the exhaust camshaft 70 is formed by branching the center oil passage 103 in the direction toward the intake camshaft 60 and in the direction toward the exhaust cam shaft 70. Accordingly, oil can be readily supplied to both the intake camshaft 60 and the exhaust camshaft 70.

The oil supplied to the intake camshaft 60, the exhaust camshaft 70 and the tensioner lifter 113 is formed of oil introduced from the oil pump 36 disposed in the crankcase 20 by way of the oil filter 37 disposed in the crankcase 20. Therefore, oil to be supplied to the tensioner lifter 113 can be cleaned and hence operability of the tensioner lifter 113 can be enhanced for a long period of time.

The upper portion of the cam chain tensioner 111 is swingable about a lower pivot, and the tensioner lifter 113 of the cylinder head 22 is mounted on the cylinder head 22 in a state inclined to be directed to the cam chain 56 and to press the cam chain 56 with an upward directional component. Accordingly, oil lubrication property of the tensioner lifter 113 can be enhanced while optimizing the direction in which the tensioner lifter 113 presses the cam chain tensioner 111.

Although the embodiment of the present invention has been described in detail, the present invention is not limited to the above-mentioned embodiment, and various modifications are conceivable. Further, the internal combustion engine of the present invention is applicable not only to the motorcycle but is widely applicable to other kinds of saddle riding vehicles.

DESCRIPTION OF REFERENCE NUMERALS AND SIGNS

E: internal combustion engine
L: cylinder axis
Lc: axis
C: axis
20: crankcase
21: cylinder body
21b: bolt insertion hole
22: cylinder head
22a: bolt accommodating hole
22b: bolt insertion hole
22h: tensioner lifter mounting surface
23: cylinder head cover
30: crankshaft
36: oil pump
37: oil lifter
56: cam chain
60: intake cam shaft
63: first intake cam
64: second intake cam
70: exhaust cam shaft 70a: right end portion
70b: left end portion
71: first bearing journal portion
72: second bearing journal portion
73: first exhaust cam
74: second exhaust cam
76: decompression shaft hole
78: decompression weight swing restricting portion
79: decompression shaft removal preventing threaded portion
80: exhaust cam shaft inner oil passage
90: decompression device
91: decompression shaft
91a: decompression weight
92: decompression pin
100: valve gear oil supply passage
102b: branching portion
102c: tensioner lifter oil supply passage
102d: valve gear side oil passage
103: center oil passage
104: journal portion communicating oil passage
110: cam chain tensioner device
111: cam chain tensioner
113: tensioner lifter
120: bolt

The invention claimed is:

1. An internal combustion engine of a saddle riding vehicle, including a crankcase rotatably supporting a crankshaft therein, a cylinder portion fixedly mounted on the crankcase with a cylinder axis inclined relative to a vertical direction, cam shafts of a valve train, a cam chain for transmitting power from the crankshaft to the camshafts, and a cam chain tensioner device for pressing and tensioning the cam chain, wherein:
the cam chain tensioner device includes a cam chain tensioner swingably supported by the crankcase to contact the cam chain, and a tensioner lifter including a plunger pressing the cam chain tensioner to cause the cam chain tensioner to press and tension the cam chain;
the tensioner lifter is disposed on an inclined upper surface of the cylinder portion and directed toward the cam chain;
the engine includes an oil pump, a valve gear oil supply passage for supplying oil from the oil pump to the camshafts, and a tensioner lifter oil supply passage for supplying oil to the tensioner lifter;
the valve gear oil supply passage has a branching portion where the tensioner lifter oil supply passage branches; and
the branching portion branches at a position higher than the tensioner lifter and communicates with the tensioner lifter disposed at a position lower than the branching portion to send oil into the tensioner lifter.

2. The internal combustion engine of a saddle riding vehicle according to claim 1, wherein:
the valve gear oil supply passage is led into the camshafts disposed above the valve gear oil supply passage through bolt insertion holes used to pass stud bolts for fixing the cylinder portion to the crankcase; and
the branching portion is formed in an intersecting manner with the bolt insertion holes.

3. The internal combustion engine of a saddle riding vehicle according to claim 2, wherein:
the cylinder portion has a tensioner lifter mounting surface for mounting the tensioner lifter thereon, the tensioner lifter mounting surface being inclined in a direction opposite to inclination of the cylinder axis of the cylinder portion;
the tensioner lifter is fixedly mounted on the cylinder portion by fastening members extending in a direction perpendicular to the tensioner lifter mounting surface; and
the tensioner lifter oil supply passage is arranged parallel to the fastening members.

4. The internal combustion engine of a saddle riding vehicle according to claim 3, wherein:
the bolt insertion holes as part of the valve gear oil supply passage are formed along a side surface of the cylinder portion;
the valve gear oil supply passage includes a center oil passage forming a portion of the valve gear oil supply passage and extending in the cylinder portion adjacent to the cylinder axis; and
the valve gear oil supply passage includes a valve-gear-side oil passage forming a portion of the valve gear oil supply passage and extending from the tensioner lifter oil supply passage to a central portion of the cylinder portion through the branching portion, to communicate with the center oil passage.

5. The internal combustion engine of a saddle riding vehicle according to claim 4, wherein:
the camshafts include an intake camshaft having an intake cam and an exhaust camshaft having an exhaust intake cam, the intake camshaft and the exhaust camshaft being arranged parallel to each other with a center of the cylinder portion located there between, as viewed in the direction of the cylinder axis; and
the center oil passage branches into oil passages toward the intake camshaft and the exhaust cam shaft to supply oil thereto.

6. The internal combustion engine of a saddle riding vehicle according to claim 5,
wherein an oil filter is provided in the crankcase to filter oil to be supplied from the oil pump to the intake camshaft, the exhaust camshaft and the tensioner lifter.

7. The internal combustion engine of a saddle riding vehicle according to claim 6, wherein:
the cam chain tensioner is pivotally supported at a lower end thereof to have an upper portion thereof to swing; and
the tensioner lifter is mounted in an inclined attitude on the cylinder portion in a state where the tensioner lifter presses the cam chain in a direction including an upward directional component.

* * * * *